(12) United States Patent
Larsen et al.

(10) Patent No.: US 11,095,213 B2
(45) Date of Patent: *Aug. 17, 2021

(54) RECONFIGURABLE SWITCHED CAPACITOR DC-DC CONVERTER FOR HEAD-WEARABLE HEARING DEVICES

(71) Applicant: GN HEARING A/S, Ballerup (DK)

(72) Inventors: Dennis Øland Larsen, Lyngby (DK); Martin Vinter, Lyngby (DK)

(73) Assignee: GN Hearing A/S

( * ) Notice: Subject to any disclaimer, the term of this patent is extended or adjusted under 35 U.S.C. 154(b) by 0 days.

This patent is subject to a terminal disclaimer.

(21) Appl. No.: 16/735,368

(22) Filed: Jan. 6, 2020

(65) Prior Publication Data
US 2020/0220456 A1     Jul. 9, 2020

Related U.S. Application Data

(63) Continuation of application No. 16/105,825, filed on Aug. 20, 2018, now Pat. No. 10,530,248.

(30) Foreign Application Priority Data

Aug. 24, 2017   (EP) .................................... 17187770

(51) Int. Cl.
*H04R 25/00*     (2006.01)
*H02M 3/07*      (2006.01)

(52) U.S. Cl.
CPC ............ *H02M 3/07* (2013.01); *H04R 25/602* (2013.01); *H04R 25/609* (2019.05); *H04R 2225/023* (2013.01); *H04R 2225/025* (2013.01); *H04R 2225/0216* (2019.05); *H04R 2225/31* (2013.01); *H04R 2225/33* (2013.01)

(58) Field of Classification Search
CPC . H04R 2225/33; H04R 2460/03; H02M 1/14; H02M 2001/009
See application file for complete search history.

(56) References Cited

U.S. PATENT DOCUMENTS 6,304,467 B1  10/2001  Nebrigic
9,900,708 B2   2/2018  Vinter
(Continued)

FOREIGN PATENT DOCUMENTS

EP  1 432 284 A2  6/2004
EP  1 432 284 A3  7/2004
(Continued)

OTHER PUBLICATIONS

Extended European Search Report dated Feb. 8, 2018 for corresponding European Application No. 17187770.7.
(Continued)

*Primary Examiner* — Matthew A Eason
(74) *Attorney, Agent, or Firm* — Vista IP Law Group, LLP

(57) ABSTRACT

The present disclosure relates to a head-wearable hearing device comprising a switched capacitor DC-DC converter. Said switched capacitor DC-DC converter comprises a plurality of individually controllable semiconductor switches and a plurality of flying capacitors. A controller is connected to respective control terminals of the plurality of individually controllable semiconductor switches to configure first and second converter sections to form first and second converter topologies, respectively.

39 Claims, 15 Drawing Sheets

(56) References Cited

U.S. PATENT DOCUMENTS

| | | | |
|---|---|---|---|
| 10,128,746 B2 | 11/2018 | Larsen et al. | |
| 10,264,371 B2 | 4/2019 | Larsen et al. | |
| 10,530,248 B2 * | 1/2020 | Larsen | H04R 25/602 |
| 2008/0284498 A1 | 11/2008 | Xu et al. | |
| 2009/0326624 A1 | 12/2009 | Melse | |
| 2013/0181521 A1 * | 7/2013 | Khlat | H02M 3/07 |
| | | | 307/31 |
| 2014/0277215 A1 | 9/2014 | Gordon | |
| 2017/0118558 A1 | 4/2017 | Renken et al. | |

FOREIGN PATENT DOCUMENTS

| | | | |
|---|---|---|---|
| EP | 2540097 B1 * | 6/2014 | H04R 25/00 |
| WO | 2011103929 A1 | 9/2011 | |

OTHER PUBLICATIONS

Communication Pursuant to Article 94(3) EPC dated Oct. 10, 2019 for corresponding European Application No. 17187770.7.

Notice of Allowance and Fee(s) dated Sep. 3, 2019 for related U.S. Appl. No. 16/105,825.

Li-Ming Chen et al. "a 1-V, 1.2-mA fully Integrated SoC for Digital Hearing Aids" (2014), Microelectronics Journal 46, pp. 12-19.

DiCristina, John. "Introduction to Hearing Aids and Important Design Considerations" May 2010, Maxim Integrated Products, 8 pages.

* cited by examiner

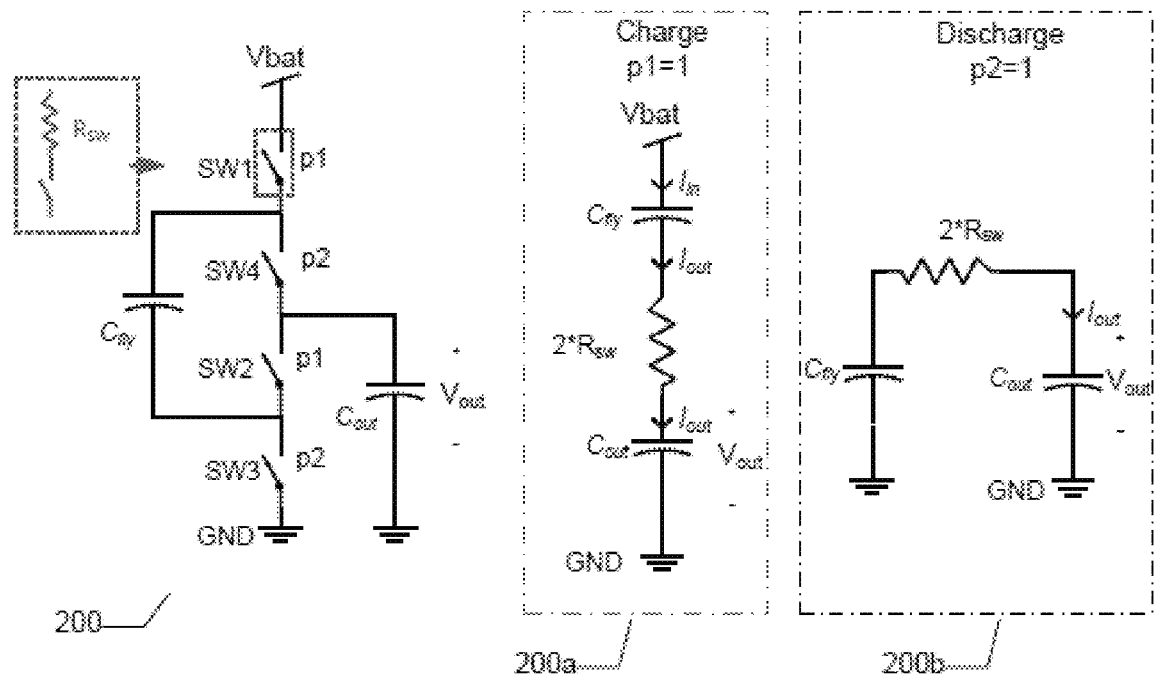
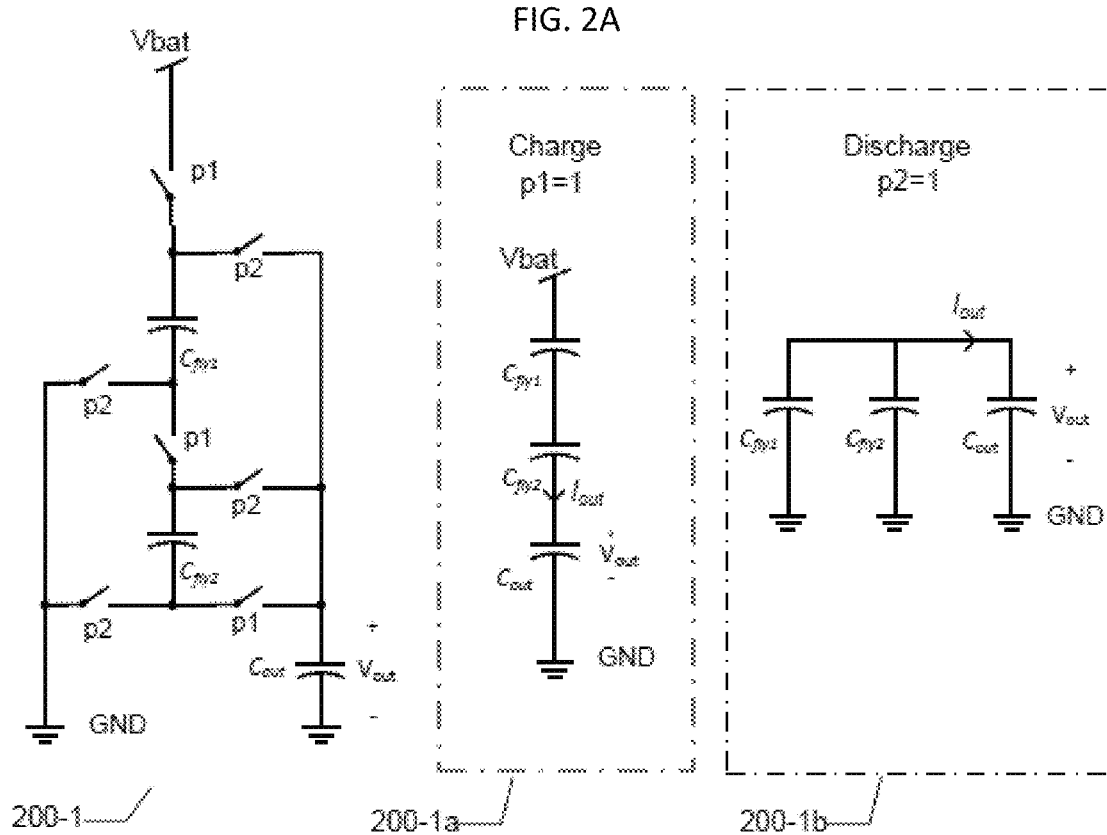
FIG. 2A
FIG. 2B

Config. 1        Config. 2        Config. 3

1100        1100        1100

RECONFIGURABLE SWITCHED CAPACITOR DC-DC CONVERTER FOR HEAD-WEARABLE HEARING DEVICES

RELATED APPLICATION DATA

This application is a continuation of U.S. patent application Ser. No. 16/105,825, filed on Aug. 20, 2018, now U.S. Pat. No. 10,530,248, which claims priority to, and the benefit of, European Patent Application No. 17187770.7 filed on Aug. 24, 2017. The entire disclosures of the above applications are expressly incorporated by reference herein.

FIELD

The present disclosure relates to a head-wearable hearing device comprising a multiple-output switched capacitor DC-DC converter. Said multiple-output switched capacitor DC-DC converter comprises a switch matrix comprising a plurality of individually controllable semiconductor switches and a plurality of flying capacitors connected between respective sets of circuit nodes of the switch matrix. A controller is connected to respective control terminals of the plurality of individually controllable semiconductor switches of the switch matrix to configure first and second converter sections to form first and second converter topologies, respectively, based on a topology selection rule.

BACKGROUND

Switched capacitor DC-DC power converters are known in the art and have been utilized in various types of portable communication devices such as head-wearable hearing devices. Switched capacitor DC-DC power converters are utilized to convert a DC input voltage from an energy or power source, such as a rechargeable battery, of the portable communication device into a higher or lower DC output voltage suitable for powering various types of integrated circuits and other active components. Switched capacitor DC-DC power converters possess certain attractive properties compared to their inductor-based counterparts—for example a relatively low level of EMI, because there is not stored energy in magnetic fields of inductors. Switched capacitor DC-DC power converters may have small size and high energy conversion efficiency. Different topologies of switched capacitor DC-DC power converters are capable of providing DC voltage step-up (i.e. boost) and DC voltage step-down (i.e. buck) with a topology dependent optimum voltage conversion ratio for example 1:2 or 1:3 step-up conversion and 2:1 and 3:1 step-down conversion.

Switched capacitor DC-DC converters are highly useful for powering head-wearable hearing devices where the compact dimensions of the housing or custom shell in conjunction with small battery capacity typically place severe constraints on size, power conversion efficiency and electromagnetic emissions of the power supply circuitry. However, there remains a need in the art for multiple-output switched capacitor DC-DC converters with improved performance characteristics such as smaller dimensions and better adaptation to varying load conditions and varying DC input voltages. In particular, providing improved energy efficiency across a wide range of loads and a wide range of DC input voltages because the DC input voltage often varies considerably e.g. due to a varying charging state of a rechargeable battery source supplying the DC input voltage.

SUMMARY

A first aspect relates to a head-wearable hearing device comprising: a multiple-output switched capacitor DC-DC converter comprising a DC input for receipt and conversion of a battery supply voltage into a first DC output voltage and a second DC output voltage;

said multiple-output switched capacitor DC-DC converter comprising:
  a switch matrix comprising a plurality of individually controllable semiconductor switches,
  P flying capacitors connected between respective sets of circuit nodes of the switch matrix;
  a controller connected to respective control terminals of the plurality of individually controllable semiconductor switches of the switch matrix to configure:
    a first converter section by selecting a first subset of individually controllable semiconductor switches and a first set of N flying capacitors to form a first converter topology configured to generate the first DC output voltage; and
    a second converter section by selecting a second subset of individually controllable semiconductor switches and a second set of (P−N) flying capacitors to form a second converter topology configured to generate the second DC output voltage;
  said controller being configured to select the first converter topology and second converter topology based on a topology selection rule;
wherein P is a positive integer >1; N is a positive integer and $0<=N<=P$.

The head-wearable hearing device may be a hearing aid, such as a BTE, RIE, ITE, ITC, or CIC, etc., hearing aid. The hearing aid may comprise one or several microphone(s) for picking-up sound from the external environment of the hearing instrument and generate a first audio signal in response. The head-wearable hearing device may alternatively be a headset, headphone, earphone, ear defender, or earmuff, etc., such as an Ear-Hook, In-Ear, On-Ear, Over-the-Ear, Behind-the-Neck, Helmet, or Headguard, etc.

Each of the P flying capacitors may comprise an external capacitor relative to an integrated circuit on which the switched capacitor DC-DC converter is integrated e.g. together with other active circuit blocks of the head-wearable hearing device. Each of the P flying capacitor may in the alternative be fully integrated on the integrated circuit, i.e. on-chip capacitors integrally formed on a semiconductor die or substrate of the integrated circuit. The number of flying capacitors, P, of the multiple-output switched capacitor DC-DC converter may be 2, 3 or 4 in practical implementations of the converter to keep size and component count of the switch matrix on a practical level for integration in the head-wearable hearing device. A head-wearable hearing device is often subjected to severe size constraints and power consumption constraints. In some configurations of the first and second converter sections N=0 such that all of the of the P flying capacitors are connected to the first converter section while other configurations of the first and second converter sections has N=P such that all of the P flying capacitors are connected to the second converter section as discussed in additional detail below with reference to the appended drawings.

The battery supply voltage may be supplied by rechargeable battery cell(s) or disposable battery cell or cells delivering the battery supply voltage to the DC input of the multiple-output switched capacitor DC-DC converter. The battery cell or cells may for example comprise a disposable Zn-Air battery or may comprise at least one rechargeable Li-Ion battery cell. Li-Ion battery cells supply a nominal battery voltage of around 4.0 V, but the battery voltage varies considerably from about 4.2 in a fully charged state to about 3.0 is a discharged state.

The frequency of the clock signal of the present switched capacitor DC-DC converter may lie between 16 kHz and 4 MHz such as between 20 kHz and 2.0 MHz. The frequency of the clock signal may set the switching frequency of the charge pump circuit since the first and second clock phases are derived from the clock signal.

Some embodiments of the switched capacitor DC-DC converter may utilize a so-called pulse-skipping mechanism to achieve regulation of the first DC output voltage and the second DC output voltage. In this embodiment, the time span between consecutive clock pulses of the clock signal varies depending on the load.

The switched capacitor DC-DC converter may in the latter embodiment be configured to step-down the received DC input voltage with a factor of approximately 2:1 and/or 3:1, depending on a charging state of the Li-Ion battery cell, to supply DC output voltage level of about 1.2 V.

The head-wearable hearing device may comprise various active components and audio transducers for receipt of incoming speech and other sound signals, processing of received sound signals and conversion of the processed sound signals into a corresponding output sound signal for application to a user's ear and/or transmission to a remote listener. The head-wearable hearing device may comprise a hearing aid which additionally comprises:
a control and processing circuit comprising:
a first audio input channel for receipt of a first audio signal and a signal processor for receipt and processing of the first audio signal for generating a compensated microphone signal according to a hearing loss of a user;
a class D output amplifier for receipt of the compensated microphone signal and generation of a modulated output signal at a predetermined modulation frequency,
a miniature receiver or loudspeaker for receipt of the modulated output signal and generation of output sound signal for application to a user's ear. The compensated microphone signal may be embedded or encoded in the wireless data signals transmitted by the magnetic inductance antenna. The compensated microphone signal may be transmitted to another hearing aid comprising a corresponding magnetic inductance antenna and compatible receipt and decoding circuitry for the encoded wireless data signals.

The first audio signal may be derived from a microphone of the hearing aid or may be derived from the wireless data signals supplied by the magnetic inductance antenna by appropriate decoding. Hence, the wireless data signals may be supplied by a remote audio signal source such as a portable microphone, another hearing instrument or a mobile phone etc. The class D output amplifier may be powered directly by the DC output voltage supplied by the switched capacitor DC-DC converter.

The signal processor may comprise dedicated digital logic circuitry, a software programmable processor or any combination thereof. As used herein, the terms "processor", "signal processor", "controller", "system", etc., are intended to refer to microprocessor or CPU-related entities, either hardware, a combination of hardware and software, software, or software in execution. For example, a "processor", "signal processor", "controller", "system", etc., may be, but is not limited to being, a process running on a processor, a processor, an object, an executable file, a thread of execution, and/or a program. By way of illustration, the terms "processor", "signal processor", "controller", "system", etc., designate both an application running on a processor and a hardware processor. One or more "processors", "signal processors", "controllers", "systems" and the like, or any combination hereof, may reside within a process and/or thread of execution, and one or more "processors", "signal processors", "controllers", "systems", etc., or any combination hereof, may be localized on one hardware processor, possibly in combination with other hardware circuitry, and/or distributed between two or more hardware processors, possibly in combination with other hardware circuitry. Also, a processor (or similar terms) may be any component or any combination of components that is capable of performing signal processing. For examples, the signal processor may be an ASIC processor, a FPGA processor, a general purpose processor, a microprocessor, a circuit component, or an integrated circuit.

The controller may be responsive to the topology selection rule to dynamically reconfigure:
the first converter section by selecting a third subset of individually controllable semiconductor switches and a third set of M flying capacitors to form a third converter topology configured to generate the first DC output voltage; and
the second converter section by selecting a fourth subset of individually controllable semiconductor switches and a fourth set of (P–M) flying capacitors to form a fourth converter topology configured to generate the second DC output voltage;
M is a positive integer; $0<=M<=P$; and $N \neq M$.

The ability of the controller to dynamically reconfigure the first and second converter sections enables dynamic redistribution of the individual capacitors of the available—P flying capacitors between the first and second converter sections. This feature enables dynamic topology changes of the first and second converter sections in response to changing load conditions as discussed in additional detail below with reference to the appended drawings.

The multiple-output switched capacitor DC-DC converter preferably comprises a clock generator which generates a clock signal and derives one or several pairs of non-overlapping clock phases therefrom for controlling the state switching of the plurality of individually controllable semiconductor switches of the switch matrix. In some embodiments, the controllable semiconductor switches of the first converter section and the controllable semiconductor switches of the second converter section may be driven by the same single pair of non-overlapping clock phases.

In an alternative embodiment of the multiple-output switched capacitor DC-DC converter, the controllable semiconductor switches of the first converter section and the controllable semiconductor switches of the second converter section are driven by the separate pairs of non-overlapping clock phases. The latter embodiment of the multiple-output switched capacitor DC-DC converter may therefore comprises:
a clock generator configured to generate first and second pairs of non-overlapping clock phases based on a clock signal;
said controller being configured to:
charge the first set of N flying capacitors of the first converter section during a first clock phase of the first pair of non-overlapping clock phases and charge the second set of (P–N) flying capacitors of the second converter section during a first clock phase of the second pair of non-overlapping clock phases; and
discharge the first set of N flying capacitors during a second clock phase of the first pair of non-overlapping clock phases and discharge the second set of (P–N) flying capacitors of the second converter section during a second phase of the second pair of non-overlapping clock phases.

The use of a separate pair of non-overlapping clock phases for each of the first and second converter sections has the advantage that it largely eliminates cross-regulation problems between the first and second DC output voltages Vo1, Vo1 generated by the first and second converter sections. A clock frequency of the first pair of non-overlapping clock phases may for example be adjusted independently of the clock frequency of the second pair of non-overlapping clock phases.

According to one embodiment of the multiple-output switched capacitor DC-DC converter using the above-described separate first and second pairs of non-overlapping clock phases, the controller is configured to:

during the first clock phase of the first pair of non-overlapping clock phases, series connecting the first set of N flying capacitors via the first subset of individually controllable semiconductor switches to charge the N flying capacitors from the DC input voltage, during the first clock phase of the second pair of non-overlapping clock phases, series connecting the second set of (P–N) flying capacitors via the second subset of individually controllable semiconductor switches and charge the (P–N) flying capacitors from the DC input voltage, during the second clock phase of the first pair of non-overlapping clock phases, parallel connecting the N flying capacitors via the first subset of individually controllable semiconductor switches and discharge the N flying capacitors into a first output capacitor connected to the first DC output voltage; and during the second clock phase of the second pair of non-overlapping clock phases, parallel connecting the third set of (P–N) flying capacitors via the third subset of individually controllable semiconductor switches and discharge the (P–N) flying capacitors into a second output capacitor connected to the second DC output voltage.

The controller is configured to select the respective topologies of the first and second converter sections based on the topology selection rule or selection criterion. The topology selection rule may be designed to optimize various performance parameters of the multiple-output switched capacitor DC-DC converter such as maximizing an intrinsic power conversion efficiency of the DC-DC converter at a given operating point of the DC-DC converter. The topology selection rule may force the controller to take a particular set of system variables of the DC-DC converter into consideration to select the respective topologies of the first and second converter sections. The system variables may comprise the battery supply voltage and/or respective load powers delivered by the first and second converter sections. Hence, the topology selection rule may comprise one or more system variables selected from:

respective load currents and/or load powers supplied by the first and second converter sections configured to the first and second converter topologies, respectively;

the battery supply voltage, Vbat;

a target or set-point voltage, Vo1, of the first DC output voltage;

a target or set-point voltage, Vo2, of the second DC output voltage;

According to one embodiment, the topology selection rule is configured to, or designed to, maximize:

a total intrinsic energy efficiency of the first and second converter sections based on the determined system variables; said total intrinsic energy efficiency being calculated according to:

$$\eta_{tot} = \frac{P_1 + P_2}{\frac{P_1}{\eta_1} + \frac{P_2}{\eta_2}}$$

wherein:

$P_1$=Load power delivered by the first converter section;
$P_2$=Load power delivered by the second converter section;
$\eta_1$=Intrinsic energy efficiency of the first converter at the set-point voltage of the first DC output voltage;
$\eta_2$=Intrinsic energy efficiency of the second converter section at the set-point voltage of the second DC output voltage;

$\eta_1$=VCR/iVCR=Vo1/(Vbat*iVCR);

$\eta_2$=VCR/iVCR=Vo2/(Vbat*iVCR).

According to this embodiment the controller uses the topology selection rule to determine a distribution of the P flying capacitors, i.e. the value of N or M for a given value f P, between the first and second converter sections and the respective topologies of the first and second converter sections at a current load scenario as discussed in additional detail below with reference to the appended drawings.

The controller may during operation of the DC-DC converter for example be configured to repeatedly determine:

a current battery supply voltage and respective current load currents or load powers at the first and second converter sections. The controller is additionally configured to switch from a first configuration of the first and second converter sections to a second configuration of the first and second converter sections if the total intrinsic energy efficiency of the second configuration exceeds the total intrinsic energy efficiency of the first configuration. Hence, the controller may dynamically switch between different configurations of the first and second converter sections in response to changing battery voltage and/or changing load conditions to repeatedly or continuously maximize the total intrinsic energy efficiency of the first and second converter sections as discussed in additional detail below with reference to the appended drawings.

According to one embodiment of the multiple-output switched capacitor DC-DC converter, the controller is responsive to a system control signal of a signal processor, such as a microprocessor of the head-wearable hearing device, to dynamically reconfigure the first and second converter sections; where said system control signal indicates an upcoming change of the load at least one of the first and converter sections. This embodiment supports feedforward control of the selection of topology of the first and second converter sections. The skilled person will understand that the signal processor may control the operational state and power consumption of various types of load circuits coupled to the first and/or second converter sections such as a wireless receiver circuit, a flash memory/EEPROM memory circuit, sensor interface circuit etc. Hence, the signal processor may tailor the system control signal to reconfigure the first and second converter sections to a known change of power consumption of the of load circuits as discussed in additional detail below with reference to the appended drawings.

According to an alternative embodiment, the topology selection rule instructs the controller to:

where the load power supplied by the first converter section is at least 5 times larger than the load current or load power supplied by the second converter section or vice versa: selecting P flying capacitors for the first topology of the first converter section and selecting zero (0) flying capacitors for the first topology of the second converter section or vice versa. This topology selection rule is relatively simple to implement by the controller from a computational perspective because the rule avoids computation of complex variables such as the previously discussed total intrinsic energy efficiency. Instead, the topology selection rule by default allocates all available, P, flying capacitors to the converter section with the dominating power consumption allowing the controller to optimize the topology of the converter section that uses the majority of power.

The multiple-output switched capacitor DC-DC converter may comprise at least one output voltage regulator to control at least one of the first and second DC output voltages. One embodiment accordingly comprises:

a first output voltage regulator comprising:

a reference voltage input for receipt of a first DC reference voltage and a feedback voltage input for receipt of a feedback voltage representative of the first DC output voltage or the second DC output voltage, an error signal generator configured to combine the first DC reference voltage and the feedback voltage to determine a first control signal, said controller being configured to generate:

the first pair of non-overlapping clock phases for the first subset of individually controllable semiconductor switches of the first converter section based on the first control signal; or the second pair of non-overlapping clock phases for the second subset of individually controllable semiconductor switches of the second converter section based on the first control signal.

The skilled person will understand that the first DC reference voltage may indicate the target or set-point voltage of the first DC output voltage or indicate the target or set-point voltage of the second DC output voltage.

The head-wearable hearing device may comprise at least one rechargeable battery cell for supplying the battery supply voltage such as one or more Li-Ion battery cell(s). The one or more Li-Ion battery cell(s) typically supplies a nominal battery voltage at around 4.0 V while battery discharge of Li-Ion battery cell(s) lead to a large variation of the supplied battery voltage—from about 4.2 V at a fully charged state and down-to about 3.0 V at a discharged state as discussed in additional detail below with reference to the appended drawings.

The first and second subsets of individually controllable semiconductor switches of the switch matrix may be non-overlapping, i.e. does not share any switch of the plurality of individually controllable semiconductor switches of the switch matrix. The third and fourth subsets of individually controllable semiconductor switches of the switch matrix may likewise be non-overlapping as discussed in additional detail below with reference to the appended drawings.

A second aspect relates to a method of dynamically configuring first and second converter sections of a multiple-output switched capacitor DC-DC converter which comprises P flying capacitors connected to respective circuit nodes of a switch matrix, said method comprising:

a) connecting a DC input of the multiple-output switched capacitor DC-DC converter to a battery supply voltage, b) building the first converter section by selecting a first subset of individually controllable semiconductor switches of the switch matrix and a first set of N flying capacitors to form a first converter topology in accordance with a topology selection rule;

c) building the second converter section by selecting a second subset of individually controllable semiconductor switches of the switch matrix and a second set of (P−N) flying capacitors to form a second converter topology in accordance with the topology selection rule;

d) generate the first DC output voltage by clocking the first subset of individually controllable semiconductor switches of the first converter section;

e) generate the second DC output voltage by clocking the second subset of individually controllable semiconductor switches of the second converter section;

wherein P is a positive integer larger than 1;

N is a positive integer between 0 and P.

A head-wearable hearing device includes: a multiple-output switched capacitor DC-DC converter comprising a DC input for receipt of a battery supply voltage, the multiple-output switched capacitor DC-DC converter configured to provide a first DC output voltage and a second DC output voltage, the multiple-output switched capacitor DC-DC converter comprising: a switch matrix comprising a plurality of individually controllable semiconductor switches, P flying capacitors, and a controller connected to respective control terminals of the plurality of individually controllable semiconductor switches of the switch matrix, to configure (1) a first converter section to form a first converter topology based on a first subset of the individually controllable semiconductor switches, and based on a first set of N flying capacitors from the P flying capacitors, for generating the first DC output voltage, and (2) a second converter section to form a second converter topology based on a second subset of the individually controllable semiconductor switches, and based on a second set of (P−N) flying capacitors from the P flying capacitors, for generating the second DC output voltage; wherein P>1; and wherein N is a positive integer, and $0<=N<=P$.

Optionally, the controller is configured to dynamically reconfigure: the first converter section to form a third converter topology configured to generate the first DC output voltage based on a third subset of the individually controllable semiconductor switches and a third set of M flying capacitors from the P flying capacitors, and the second converter section to form a fourth converter topology configured to generate the second DC output voltage based on a fourth subset of the individually controllable semiconductor switches and a fourth set of (P−M) flying capacitors from the P flying capacitors; wherein M is a positive integer; $0<=M<=P$; and $N \neq M$.

Optionally, the multiple-output switched capacitor DC-DC converter further comprises a clock generator configured to generate first and second pairs of non-overlapping clock phases based on a clock signal, and wherein the controller is configured to: charge the first set of N flying capacitors of the first converter section during a first clock phase of the first pair of non-overlapping clock phases, and charge the second set of (P−N) flying capacitors of the second converter section during a first clock phase of the second pair of non-overlapping clock phases; and discharge the first set of N flying capacitors during a second clock phase of the first pair of non-overlapping clock phases, and discharge the second set of (P–N) flying capacitors of the second converter section during a second phase of the second pair of non-overlapping clock phases.

Optionally, the controller is configured to: during a first clock phase of a first pair of non-overlapping clock phases, series connect the first set of N flying capacitors via the first subset of individually controllable semiconductor switches to charge the N flying capacitors, and during a first clock phase of a second pair of non-overlapping clock phases, series connect the second set of (P–N) flying capacitors via the second subset of individually controllable semiconductor switches to charge the (P–N) flying capacitors.

Optionally, the controller is configured to: during a second clock phase of the first pair of non-overlapping clock phases, parallel connect the N flying capacitors via the first subset of individually controllable semiconductor switches to discharge the N flying capacitors into a first output capacitor, and during a second clock phase of the second pair of non-overlapping clock phases, parallel connect the second set of (P–N) flying capacitors via the second subset of individually controllable semiconductor switches to discharge the (P–N) flying capacitors into a second output capacitor.

Optionally, the controller is configured to operate based on: a load current or a load power supplied by the first converter section, a load current or a load power supplied by the second converter section, the battery supply voltage, a target or a set-point voltage, Vo1, of the first DC output voltage, a target or a set-point voltage, Vo1, of the second DC output voltage, or any combination of the foregoing.

Optionally, the controller is configured to operate in a way that maximizes a total intrinsic energy efficiency $n_{tot}$ of the first and second converter sections, wherein:

$$\eta_{tot} = \frac{P_1 + P_2}{\frac{P_1}{\eta_1} + \frac{P_2}{\eta_2}}$$

and wherein: $P_1$=Load power delivered by the first converter section; $P_2$=Load power delivered by the second converter section; $\eta_1$=Intrinsic energy efficiency of the first converter at a target or a set-point voltage of the first DC output voltage; and $\eta_2$=Intrinsic energy efficiency of the second converter section at a target or a set-point voltage of the second DC output voltage.

Optionally, the controller is configured to repeatedly determine: a value of the battery supply voltage, a value of load current or load power of the first converter section, and a value of load current or load power of the second converter section.

Optionally, the controller is configured to switch a first configuration of the first and second converter sections to a second configuration of the first and second converter sections if a total intrinsic energy efficiency of the second configuration exceeds a total intrinsic energy efficiency of the first configuration.

Optionally, the controller is configured to dynamically reconfigure the first and second converter sections in response to a system control signal of a signal processor of the head-wearable hearing device, the system control signal indicating an upcoming change of load.

Optionally, the controller is configured to select P flying capacitors for the first topology of the first converter section, and to select zero (0) flying capacitors for the second topology of the second converter section, in response to a load current or a load power supplied by the first converter section being at least 5 times larger than a load current or a load power supplied by the second converter section.

Optionally, the controller is configured to select zero (0) flying capacitors for the first topology of the first converter section, and to select P flying capacitors for the second topology of the second converter section, in response to a load current or a load power supplied by the second converter section being at least 5 times larger than a load current or a load power supplied by the first converter section.

Optionally, the multiple-output switched capacitor DC-DC converter comprises an output voltage regulator; and wherein the output voltage regulator comprises: a reference voltage input for receipt of a first DC reference voltage, a feedback voltage input for receipt of a feedback voltage representative of the first DC output voltage or the second DC output voltage, and an error signal generator configured to combine the first DC reference voltage and the feedback voltage to determine a first control signal. Optionally, the controller is configured to generate: a first pair of non-overlapping clock phases for the first subset of the individually controllable semiconductor switches of the first converter section based on the first control signal; and/or a second pair of non-overlapping clock phases for the second subset of the individually controllable semiconductor switches of the second converter section based on the first control signal.

Optionally, the head-wearable hearing device further includes at least one rechargeable battery cell for supplying the battery supply voltage.

Optionally, P=2, 3 or 4.

Optionally, the first and second subsets of individually controllable semiconductor switches of the switch matrix are non-overlapping.

Optionally, the P flying capacitors are connected to circuit nodes of the switch matrix.

A method of configuring first and second converter sections of a multiple-output switched capacitor DC-DC converter which comprises P flying capacitors and a switch matrix having a plurality of individually controllable semiconductor switches, includes: configuring the first converter section to form a first converter topology based on a first subset of the individually controllable semiconductor switches of the switch matrix, and based on a first set of N flying capacitors from the P flying capacitors; and configuring the second converter section to form a second converter topology based on a second subset of the individually controllable semiconductor switches of the switch matrix, and based on a second set of (P–N) flying capacitors from the P flying capacitors; wherein P>1; and wherein N is a positive integer, and 0<=N<=P.

Optionally, the acts of configuring are performed dynamically.

A method of generating first DC output voltage and second DC output voltage using the configured first converter and the configured second converter, includes: generate the first DC output voltage by clocking the first subset of the individually controllable semiconductor switches of the first converter section; and generate the second DC output voltage by clocking the second subset of the individually controllable semiconductor switches of the second converter section.

BRIEF DESCRIPTION OF THE DRAWINGS

Embodiments will be described in more detail in connection with the appended drawings, in which:

FIGS. 2A-2B show first and second simplified schematic block diagrams of first and second switched capacitor DC-DC converters, respectively.

DESCRIPTION OF PREFERRED EMBODIMENTS

Figure 1:
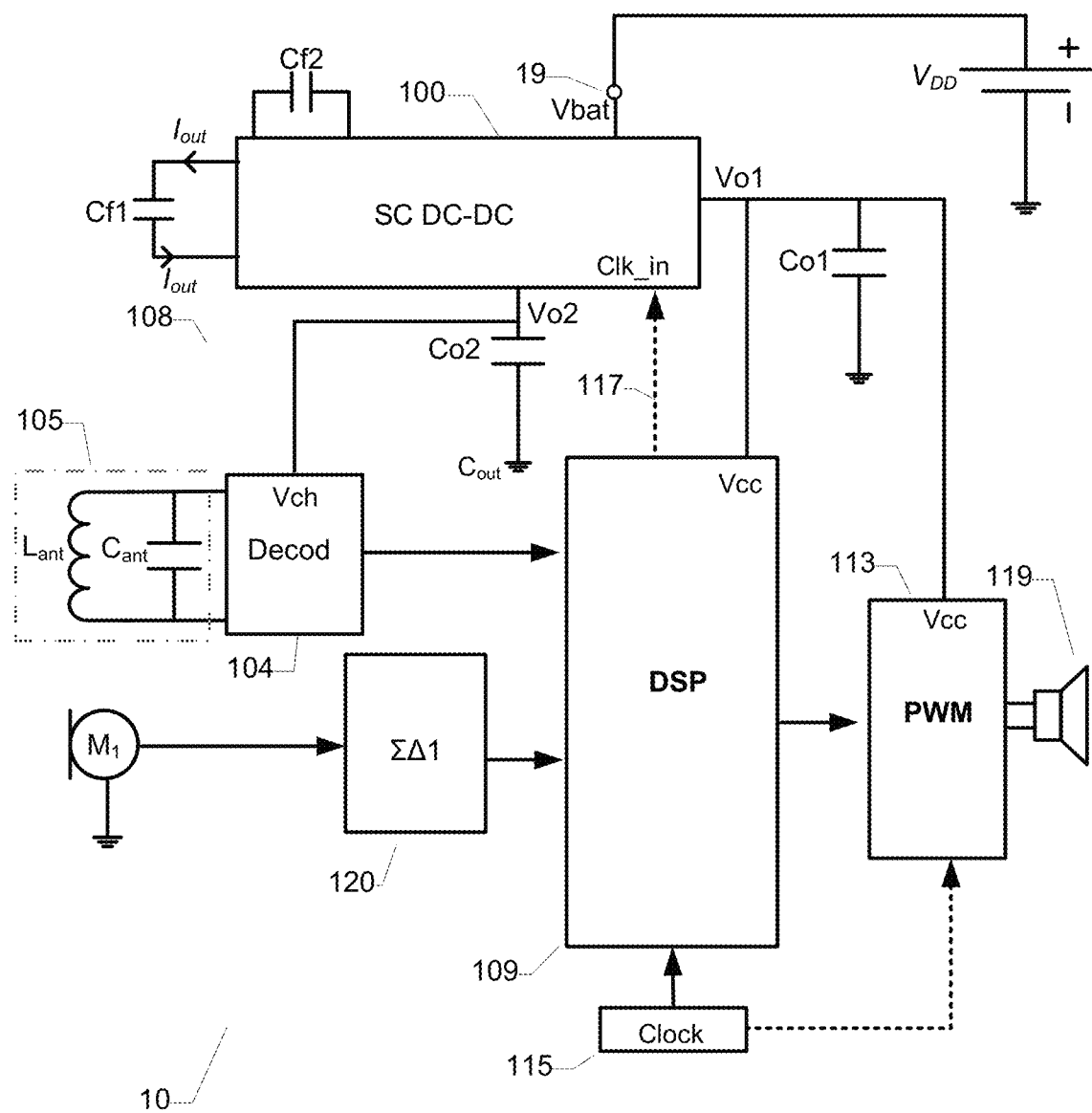
FIG. 1 shows a simplified schematic block diagram a head-wearable hearing device comprising an exemplary switched capacitor DC-DC converter according to any of the below-described embodiments thereof.

Various embodiments are described hereinafter with reference to the figures. It should be noted that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following, various exemplary embodiments of the present head-wearable hearing device, comprising a multiple output switched capacitor DC-DC converter for energy efficient DC voltage conversion, are described with reference to the appended drawings. The skilled person will understand that the appended drawings are schematic and simplified for clarity. The skilled person will further appreciate that certain actions and/or steps may be described or depicted in a particular order of occurrence while those skilled in the art will understand that such specificity with respect to sequence is not actually required.

FIG. 1 shows a simplified schematic block diagram of an exemplary head-wearable hearing device 10 comprising a multiple output switched capacitor DC-DC converter 100 according to any of the below-described embodiments thereof. The DC input voltage input of the switched capacitor DC-DC converter 100 is connected to a rechargeable battery source $V_{DD}$. The rechargeable battery source is connected to the hearing device circuitry, including the integrally formed switched capacitor DC-DC converter 100, through a positive supply voltage terminal 19. The skilled person will understand that the battery source in other embodiments may comprise a non-rechargeable battery source where it is desired to step-up or step-down the nominal DC voltage level supplied by such non-rechargeable battery source to a different DC voltage level more optimal, e.g. lower power consumption, for active circuits or circuit blocks. The hearing instrument 10 may comprise any type of hearing aid housing style such as Behind-the-Ear (BTE), In-the-Canal (ITC), Completely-in-Canal (CIC), RIC etc.

The rechargeable battery source VDD may comprise at least one Li-Ion battery cell and may hence supply a nominal DC input voltage Vbat at around 4.0 V to the switched capacitor DC-DC converter 100. However, the battery discharge curve of Li-Ion battery cells lead to a large variation of the DC input voltage Vbat from about 4.2 V at a fully charged state and down-to about 3.0 V at a discharged state and this places several implications for the design and topology selection of the converter sections of the switched capacitor DC-DC converter 10 as discussed below.

The multiple output switched capacitor DC-DC converter 100 is configured to step-down the received DC input voltage with various conversion factors to supply a first DC output voltage Vo1 of about 1.2 V and supply a second DC output voltage Vo1 which may be higher than Vo1 such nominally about 1.8 V. The skilled person will understand that the first DC output voltage Vo1 may deviate from 1.2 V, e.g. having voltage anywhere between from 0.6 V and 1.2 V and the second DC output voltage Vo1 likewise deviate from 1.8 V for example lie between 1.4 and 2.2 V. A first output/smoothing capacitor Co1 is connected to the first DC output voltage Vo1. The 1.2 V DC output voltage typically provides optimum or near-optimum power supply conditions for certain individual circuits or circuit blocks of the hearing device such as a class D output amplifier 113 or certain support circuit within the DSP 109. The second DC output voltage Vo1 may be connected to certain other circuit blocks of the hearing device such as a wireless receiver and decoder 104 which is coupled to an RF antenna 105 for receipt of wireless RF modulated digital audio signals and/or data signals. The skilled person will understand that the wireless receiver and decoder 104 may be compliant with a Bluetooth standard such as the Bluetooth LE standard. The wireless receiver and decoder 104 may need the 1.8 V supply voltage level provided by the second DC output voltage Vo1 to function correctly or at least function optimally and therefore needs a separate DC supply voltage instead of the first DC output voltage. Furthermore, the skilled person will appreciate that the wireless receiver and decoder 104 may be switched between an operative mode where its power or current consumption is relatively high and a sleep or stand-by mode where its power or current consumption is relatively low for example at least 10 times smaller than the operative mode. Many other circuit blocks, for example flash memory/EEPROM memory or sensor interface circuits, of the hearing device 10 that are powered by the second DC output voltage Vo1 may have a similar time varying current or power consumption. This time varying current consumption leads to certain challenges for traditional fixed topology switched capacitor DC-DC converters while a configurable property of the present switched capacitor DC-DC converter 100 is able to adapt to the current power consumption as discussed in additional detail below. The capacitance of each of the first and second output/smoothing capacitors Co1, Co2 may be larger than 500 nF such as between 1 and 10 μF while the capacitance of each of the first and second flying capacitors Cf1 and Cf1 may lie between 10-500 nF. The output/smoothing capacitors and/or the flying capacitors Cf1, Cf2 may be external to an integrated circuit on which the switched capacitor DC-DC converter 100 is integrated together with other active circuit blocks of the hearing device. The other active circuits of the hearing instrument may comprise an analog-to-digital converters ΣΔ1 120, a clock generator 115, the class D output amplifier 113.

The hearing device 10 comprises at least one microphone $M_1$ generating an audio signal in response to incoming sound at the hearing instrument. The audio signal is amplified/buffered and digitized in an input channel comprising an optional microphone preamplifier (not shown) and the analog-to-digital converter 120 to provide a digital microphone signal to an appropriate input port or channel of the control and processing circuit 109. The control and processing circuit 109 may comprise a software programmable DSP core and may apply one or more signal processing functions to the digital microphone signal under control of a set of executable program instructions or code. The one or more signal processing functions may be adapted to process the digital microphone signal according to a hearing loss of a user of the hearing device in embodiments where the latter comprises a hearing aid or hearing compensating functionality such that an appropriately compensated microphone signal is supplied to the user via the loudspeaker 119. These signal processing functions may comprise different processing parameters of functions like non-linear amplification, noise reduction, frequency response shaping etc. Hence, various processing parameters of the one or more signal processing functions may have been determined during a preceding hearing aid fitting session with the user at an audiologist office and loaded into a non-volatile data memory space of the control and processing circuit 109. The control and processing circuit 109 is clocked by a master clock signal supplied by a master/system clock generator 115 and the clock frequency may lie above 2 MHz for example between 2 and 40 MHz. The master clock generator 115 may additionally supply synchronous clock signals to the analog-to-digital converter ΣΔ1 and the class D output amplifier 113. As discussed above, the class D output amplifier 113 may convert the compensated microphone signal into a corresponding modulated output signal at a predetermined modulation frequency which is applied to the miniature receiver or loudspeaker 119 for production of sound pressure in the hearing instrument user's ear canal. The modulation frequency of the class D output amplifier may vary depending on the type of modulation scheme and performance requirement of the amplifier in a specific application. The class D output amplifier 113 may be configured to PWM or PDM modulate the output signal to the loudspeaker 119 with a modulation frequency between 250 kHz and 2 MHz.

The SC DC-DC converter 100 is clocked by a fixed or adjustable clock frequency which may be selected or controlled by a suitable output voltage regulator. The clock frequency of the SC DC-DC converter 100 may lie between 16 kHz and 4 MHz such as between 20 kHz and 2 MHz. According one embodiment of the present hearing device the clock frequency of the SC DC-DC converter 100 and the predetermined modulation frequency of the class D output amplifier are synchronous. This feature is particularly advantageous to maintain a well-defined relationship between the switching frequencies of the SC DC-DC converter 100 and the modulation frequency of class D output amplifier 113 despite temperature variations and component drift etc.

FIG. 2A) is a simplified schematic block diagram of a charge pump stage of a first switched capacitor DC-DC converter with fixed topology. The switched capacitor DC-DC converter is a step-down 2:1 topology configured for converting a DC input voltage Vbat into a DC output voltage of approximately one-half of the DC input voltage. The charge pump circuit 200 comprises a flying capacitor $C_{fly}$, an output/smoothing capacitor $C_{out}$ and a switch array including a first controllable semiconductor switch SW1, a second controllable semiconductor switch SW2, a third controllable semiconductor switch SW3 and a fourth controllable semiconductor switch SW4. Switches SW1 and SW2 are driven by a first clock phase $\varphi_1$ of a clock signal and switches SW3 and SW4 are driven by a second clock phase $\varphi_2$ of the clock signal as schematically illustrated on the drawing. The first and second clock phases $\varphi_1$, $\varphi_2$ (alternatively designated p1, p2 on the drawings) of the clock signal are complementary and non-overlapping. The DC input voltage Vbat to the charge pump circuit 200 is applied to switch SW1 and the DC output voltage $V_{out}$ is delivered at output/smoothing capacitor $C_{out}$. A load of the charge pump circuit 200 is connected across the output/smoothing capacitor $C_{out}$ and the skilled person will understand the latter supplies energy power to the load when the flying capacitor $C_{fly}$ is charging from the DC input voltage. The skilled person will appreciate that each of the controllable semiconductor switches SW1, SW2, SW3 and SW4 may comprise a MOSFET, e.g. NMOS transistor, or a combination of MOSFETs, as the small size, large off-resistance and low on-resistance of MOSFET switches are advantageous properties in numerous applications of the charge pump circuit 200. In the present step-down topology of the charge pump circuit 200, SW1 is connected between the DC input voltage Vbat and a positive terminal of the flying capacitor SW4; SW2 is connected between a negative terminal of the flying capacitor SW4 and the DC output voltage. In an alternative 1:2 step-up embodiment, SW2 is connected between the negative terminal of the flying capacitor and a negative DC supply rail, such as GND. SW3 is connected between the negative terminal of the flying capacitor and the negative DC supply rail—e.g. GND. In the alternative 1:2 step-up embodiment, SW3 is connected between the negative terminal of the flying capacitor and the DC input voltage. SW4 is connected between the positive terminal of the flying capacitor and the DC output voltage. During operation of the charge pump circuit 200, the first and second switches SW1, SW2 are switched between respective on-states and off-states in accordance with the first clock phase $\varphi_1$ and the third and fourth switches SW3, SW4 are switched between respective on-states and off-states in accordance with the second clock phase $\varphi_2$. Hence, the switch array is configured to, in or during the first clock phase, charge the flying capacitor $C_{fly}$ from the DC input voltage Vbat through the on-resistances of SW1 and SW2. The combined on-resistance of SW1 and SW2 is schematically represented by resistor $2*R_{SW}$.

Furthermore, during the first clock phase, the switches SW3 and SW4 are off or non-conducting which lead to the equivalent schematic circuit diagram 200a. As illustrated, the flying capacitor $C_{fly}$ and output capacitor $C_{out}$ are effectively connected in series between the DC input voltage $V_{in}$ and GND such that the output voltage is charged to approximately one-half of the DC input voltage by periodically switching between the first and second clock phases in steady state operation when no load current is drawn from the output voltage of the charge pump circuit 200. The switch array is configured to, in or during the second clock phase $\varphi_2$, discharge the flying capacitor $C_{fly}$ into the output capacitor $C_{out}$ through a charge sharing mechanism due to the parallel connection of the flying capacitor and output capacitor through the conducting states of the switches SW3 and SW4. During the second clock phase, the switches SW1 and SW2 are off, i.e. or non-conducting, which leads to the equivalent schematic circuit diagram 200b. As illustrated, the flying capacitor $C_{fly}$ and output capacitor $C_{out}$ are effectively connected in parallel and disconnected from the DC input voltage Vbat. The skilled person will appreciate that each of the controllable semiconductor switches SW1, SW2, SW3 and SW4 may comprises a control terminal (not shown), e.g. a gate terminal for MOSFETs, to which the first or second clock phases $\varphi_1$, $\varphi_2$ are applied to selectively switch the controllable semiconductor switch in question between its on-state and off-state.

FIG. 2B is a simplified schematic block diagram of a charge pump stage 200-1 of a second switched capacitor DC-DC converter with fixed topology. The present embodiment of the switched capacitor DC-DC converter may be designed to provide step-down conversion ratios of 1/3, 1/2 and 2/3 by appropriate adaptation of the converter topology. The present charge pump circuit 200-1 comprises, in contrast to the previously discussed pump circuit 200, two separate flying capacitors—a first flying capacitor $C_{fly1}$ and a second flying capacitor $C_{fly2}$. The charge pump circuit 200-1 comprises additionally an output/smoothing capacitor $C_{out}$ and a switch array including a total of seven controllable semiconductor switches controlled by respective clock phases of the first and second non-overlapping clock phases $\varphi_1$, $\varphi_2$ as illustrated. During operation of the charge pump circuit 200, the switch array is configured to, in or during the first clock phase, simultaneously charge the first flying capacitor $C_{fly1}$ and second flying capacitor $C_{fly2}$ from the DC input voltage $V_{in}$ through the on-resistances of active switches. Furthermore, during the first clock phase, the switches operated by the second clock phase $\varphi_2$ are off or non-conducting which leads to the equivalent schematic circuit diagram 200-1a. As illustrated, the first and second flying capacitors and the output capacitor $C_{out}$ are effectively connected in series between the DC input voltage Vbat and GND, or another negative supply rail, such that the output voltage is charged to approximately one-third of the DC input voltage in steady state operation of the pump circuit for the reasons discussed above in connection with the first charge pump circuit 200. The switch array is configured to, during the second clock phase $\varphi_2$, discharge the first and second flying capacitors into the output capacitor $C_{out}$ through a charge sharing mechanism caused by the parallel connection of the first and second flying capacitors and output capacitor through the respective on-resistances of the active/conducting switches. During the second clock phase, the switches operated by the first clock phase $\varphi_1$ are off or non-conducting while the switches operated by the second clock phase $\varphi_2$ are on or conducting which lead to the equivalent schematic circuit diagram 200-1b of the charge pump circuit 200-1. As illustrated, the first and second flying capacitors $C_{fly1}$ and $C_{fly2}$ and the output capacitor $C_{out}$ are effectively connected in parallel and disconnected from the DC input voltage Vbat.

Figure 3:
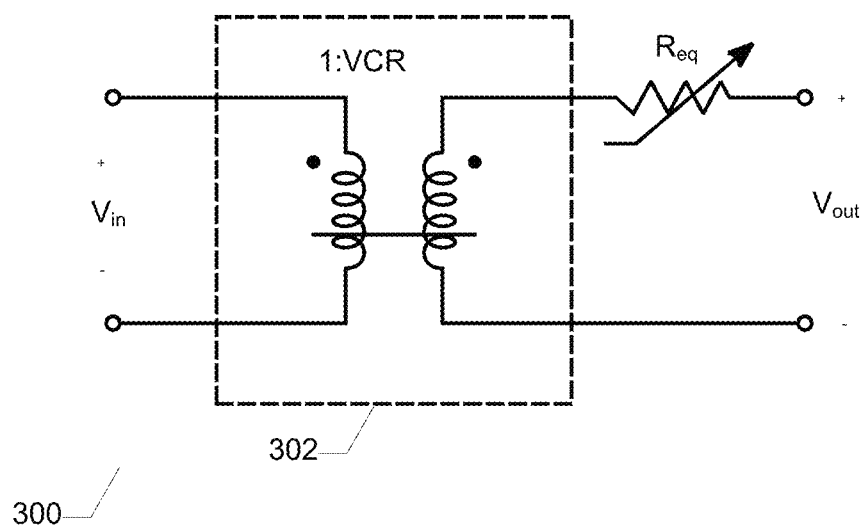
FIG. 3 shows a generally applicable electrical model of a switched capacitor DC-DC converter.

FIG. 3 is a generally applicable model 300 of a switched capacitor DC-DC converter which model is discussed below to highlight the background of some of the advantageous properties of multiple output switched capacitor DC-DC converters in accordance with some embodiments. The DC input voltage $V_{in}$ feeds input power or energy to switched capacitor DC-DC converter and during operation the latter generates the DC output voltage Vout which may be higher or lower than the DC input voltage depending on the topology of the switched capacitor DC-DC converter as discussed above. Generally, switched capacitor DC-DC converter efficiencies suffer by both intrinsic energy losses which are due to the linear loss when the SC DC-DC converter is operated with a voltage conversion ratio (VCR) deviating from the so-called ideal voltage conversion ratio, iVCR, and some "extrinsic losses" due to e.g. parasitic capacitances at nodes of the output stage, gate capacitances of the semiconductor switches etc. The on-resistance of the latter switches leads to intrinsic power losses in the switched capacitor DC-DC converter because excess power of regulating the DC output voltage to a level below Vbat*iVCR is dissipated in these on-resistances.

Experience shows that the intrinsic energy losses typically are dominating in switched capacitor DC-DC converter designs using external SMD capacitors as flying capacitors because the ratio of useful to parasitic capacitance is very large for such external capacitors. The intrinsic and extrinsic loss mechanisms of a switched capacitor DC-DC converter is illustrated by the model 300 of FIG. 3 comprising an ideal transformer 302 with a variable winding ratio as set by the actual VCR (i.e. $V_{out}/V_{in}$) and an equivalent loss resistance $R_{eq}$ connected in series with a secondary winding of the transformer 302. The loss resistance $R_{eq}$ comprises two separate resistance components:

1) a first resistance component representing an equivalent output resistance associated with switching of the one or more flying capacitors at the clock frequency of the clock signal driving the first and second clock phases. The skilled person will understand that this equivalent output resistance is inversely proportional to the clock frequency such that increasing clock frequency leads to decreasing equivalent output resistance; and 2) a second resistance component representing the combined on-resistance of the active semiconductor switches in any particular clock phase, e.g. on-resistances of the switches SW1 and SW2 in the first clock phase $\varphi_1$ of the previously discussed exemplary 2:1 step-down charge pump circuit 100.

A switched capacitor DC-DC converter is particularly energy or power efficient when the DC input voltage and the DC output voltage are related by one of the ideal voltage conversion ratio iVCR(s) associated with the topology of the SC DC-DC converter such as 1/3 or 1/2 or 2/3 or 2, or 3 or 5 etc. A larger number of flying capacitors enables a growing number of possible converter topologies and associated iVCRs as illustrated by Table 1 below illustrating the rapid growth of iVCRs with n for a step-down type switched capacitor DC-DC converter:

TABLE 1

| Number of $C_{fly}$, n | N(n) |
|---|---|
| 1 | 1/2  1/1 |
| 2 | 1/3  1/2  2/3  1/1 |
| 3 | 1/5  1/4  1/3  2/5  1/2  3/5  2/3  3/4  4/5  1/1 |

As discussed above, the so-called intrinsic energy loss of the switched capacitor DC-DC converter is minimized, or equivalently the intrinsic energy efficiency is maximized, when the converter is operated at one of the iVCRs. Hence, it would seem desirable to include a large number of flying capacitors in a switched capacitor DC-DC converter design to enable multiple converter topologies or gears if the DC input voltage varies widely and/or the target DC output voltage varies widely. The large number of converter topologies makes it possible to select a converter topology which possesses an iVCR close to any desired operating point of the SC converter and thereby ensure a high intrinsic energy efficiency of the converter. However, a large number of external capacitors is generally undesirable due to increasing carrier footprint, increasing manufacturing costs etc. of the switched capacitor DC-DC converter. These disadvantages are particularly pronounced for compact wearable devices like hearing instruments and headsets that are severely space constrained.

Figure 4:
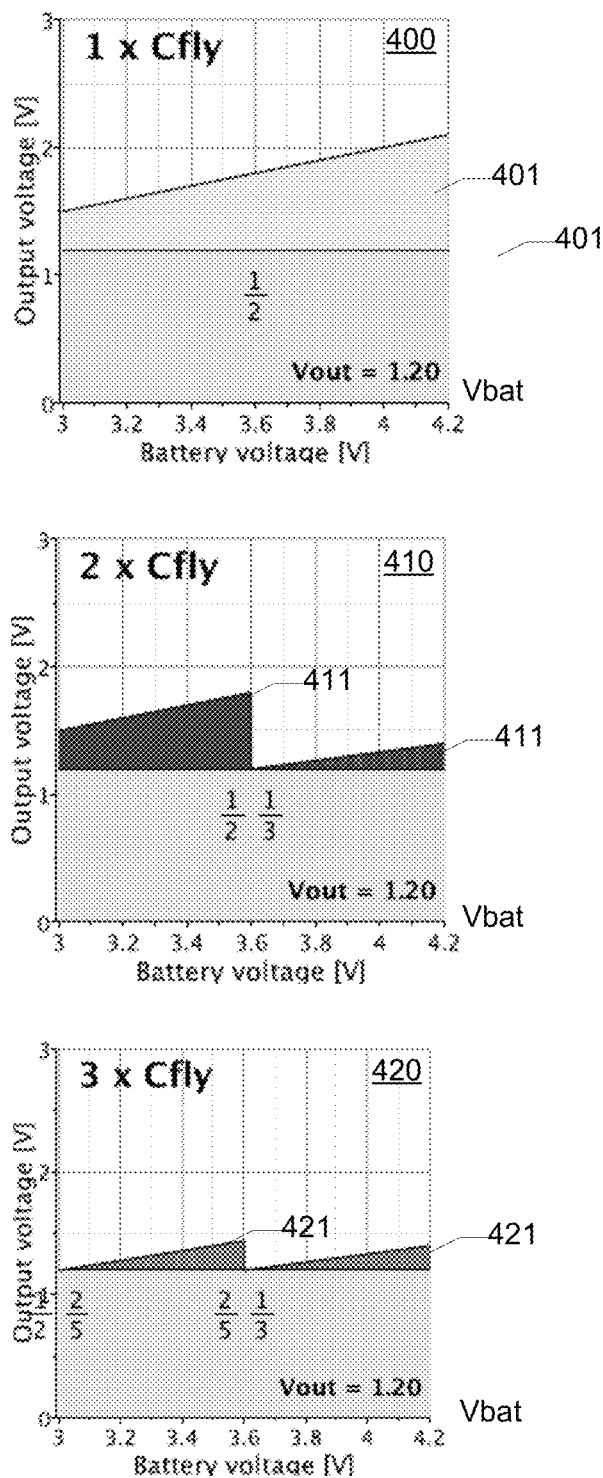
FIG. 4 shows plots 400, 410 and 420 illustrating schematically respective intrinsic energy losses of three exemplary topologies of step-down SC DC-DC converters over a preset DC input voltage range for a nominal or set-point DC output voltage of 1.2 V.

The plots 400, 410 and 420 of FIG. 4 illustrate schematically respective intrinsic energy losses of three exemplary topologies of step-down SC DC-DC converters for a DC input voltage range, Vbat, between 3.0 V and 4.2 V when the nominal or set-point DC output voltage of the converter is fixed at 1.2 V. The plots 400, 410 and 420 illustrate how a larger number of flying capacitors, and hence available converter topologies, of the switched capacitor DC-DC converter is effective in reducing the intrinsic energy losses of the converter under variable DC input voltage conditions.

The shaded area 401 of the upper plot 400 represents the intrinsic energy losses of the step-down SC DC-DC converter for a fixed 2:1 topology across the DC input voltage range from 3.0 to 4.2 V. The latter voltage range corresponds largely to the earlier discussed variation of the supply voltage of Li-Ion battery cells. The only available voltage conversion ratios (VCRs) of this converter topology are 1 and 1/2 where the latter topology has iVCRs at DC output voltages between 1.5 V and 2.1 V. The DC output voltage of 2.1 V is quite far removed from the iVCRs of this topology. In other words, a large voltage drop, as illustrated by the shaded area 401, is induced across the above-discussed equivalent loss resistance $R_{eq}$ of the SC converter, most pronounced at Vbat=4.2 V but also at lower battery voltages such as Vbat=3.6 V leading to correspondingly large energy dissipation in $R_{eq}$.

The shaded area 411 of the middle plot 410 illustrates the significant reduction of intrinsic energy losses at the DC input voltage (Vbat) range above 3.6 V of the step-down SC DC-DC converter with two flying capacitors leading to numerous new topologies as illustrated in Table 1 above. Below Vbat=3.6 V, the optimum converter topology or "gear" is still 1/2, but when Vbat reaches 3.6 V, the converter topology is switched to 1/3 which leads to iVCR operation of the SC converter at this operating point (combination of Vbat and target/set-point DC output voltage). Hence, the intrinsic energy loss of the SC converter is reduced to about zero at the 3.6 V operating point, but the intrinsic energy loss is still increasing with increasing Vbat voltage due to the increasing distance to the ideal operating point of the converter at higher Vbat voltages.

The shaded areas 421 of the lowermost plot 420 illustrate the significant reduction of the intrinsic energy losses across the entire DC input voltage (Vbat) range both below and above 3.6 V of the step-down SC DC-DC converter with three flying capacitors compared to the plot 400 for the first SC converter topology. Below Vbat=3.6 V, the best converter topology or "gear" choice is now 2/5 rather than the 1/2 topology utilized for the previous topology illustrated on plot 410. When Vbat reaches 3.6 V, the converter topology is switched to 1/3 topology which again leads to iVCR operation of the converter at this 3.6 V operating point (combination of Vbat and target/set-point DC output voltage). Hence, the switching to the 1/3 topology reduces the intrinsic energy loss of the SC converter to approximately zero at this particular operating point even though the intrinsic energy loss unavoidably increases with increasing Vbat voltage.

Figure 5:
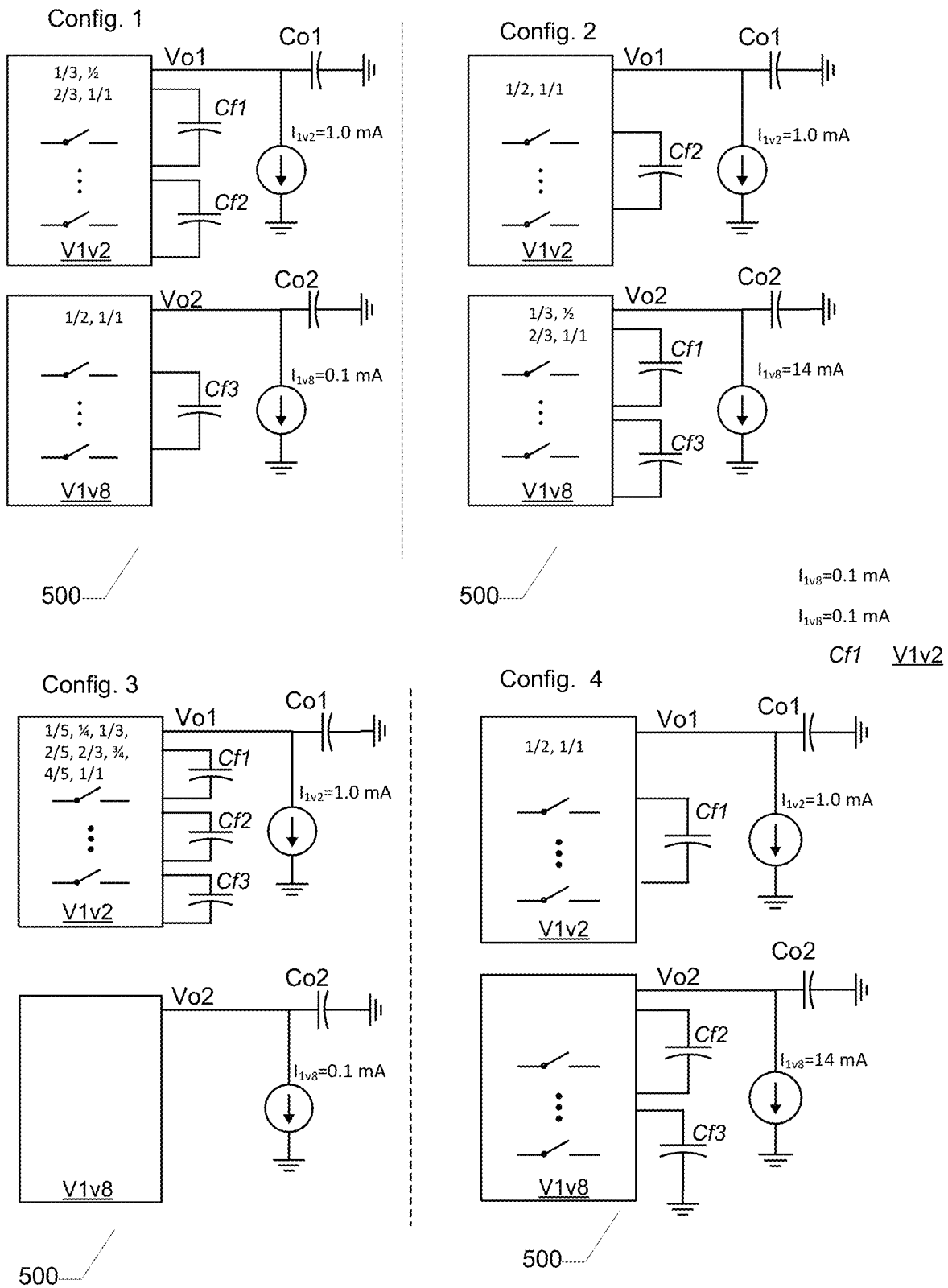
FIG. 5 shows simplified schematic block diagrams of four exemplary configurations of a reconfigurable step-down multiple output SC DC-DC converter in accordance with a first embodiment.

FIG. 5 shows simplified schematic block diagrams of four exemplary configurations—Config.1, Config.2, Config 3, Config 4—of a step-down multiple output switched capacitor (SC) DC-DC converter 500 in accordance with a first embodiment thereof. The multiple output switched capacitor (SC) DC-DC converter 500 may for example replace the previously discussed SC DC-DC converter of the hearing device 10 discussed in connection with FIG. 1 for supplying various circuit blocks with appropriate DC supply voltage. The multiple output switched capacitor (SC) DC-DC converter 500 comprises a first converter section V1v2 configured to generate a first DC output voltage Vo1 which may lie between nominally 0.6 V and 1.2 V depending on voltage supply requirements of the circuit blocks powered by the first DC output voltage Vo1. The SC DC-DC converter 500 comprises a second converter section V1v8 configured to generate a second DC output voltage Vo1 which may be between nominally 1.4 V and 2.2 V depending on voltage supply requirements of the circuit blocks powered by the second DC output voltage Vo1. The SC DC-DC converter 500 is dynamically reconfigurable by enabling dynamic redistribution of the individual capacitors of the available set of flying capacitors Cf1, Cf2 and Cf3 between the first and second converter sections V1v2, V1v8. This feature enables dynamic topology changes of the first and second converter sections V1v2, V1v8—e.g. carried out in response to changing load conditions i.e. varying load current or load power at the first and second DC output voltages Vo1, Vo1. The redistribution of the available set of flying capacitors Cf1, Cf2 and Cf3 may be carried out by a suitable controller of the SC converter. The controller is connected to a common switch matrix (not shown) of the first and second converter sections V1v2, V1v8 and the controllable semiconductor switches of the switch matrix are interconnecting the flying capacitors Cf1, Cf2 and Cf3 as discussed in additional detail below. The controller may comprise a digital state machine of the SC DC-DC converter 500.

The controller may be configured to change the respective topologies of the first and second converter sections V1v2, V1v8 based on a suitable topology selection rule or selection criterion which for example aims at maximizing the intrinsic power conversion efficiency of the entire SC DC-DC converter 500 taking into consideration the Vbat voltage and the current load powers delivered by the first and second DC output voltages.

The block diagrams of the four separate configurations—Config.1, Config.2, Config. 3 and Config.4—illustrate different load conditions at the first and second DC output voltages Vo1, Vo1 and a few possible ways of dynamically reconfiguring the SC DC-DC converter 500 for example by different embodiments. The controller of the SC DC-DC converter 500 may be configured to switch between Config.1 and Config.2 under load conditions where the load current $I_{v2}$, or equivalent load power, drawn at the first DC output voltage Vo1 is relatively constant, e.g. 1 mA, over time while the load current $I_{1v8}$ or power drawn at the second DC output voltage Vo1 is highly variable over time for example varying between 0.1 mA and 14 mA as indicated. The 0.1 mA load current $I_{1v8}$ may for example be drawn during 90% of the operative time of the SC DC-DC converter 500 while the 14 mA load current is drawn during the residual 10% of the operative time. These kind of temporal power consumption fluctuations are common characteristics of certain circuit blocks or modules, e.g. flash memory, that are only temporarily utilized by the hearing device and therefore reside in sleep-mode/power-down in long time periods interrupted by relatively brief bursts of activity leading to a correspondingly burst of power consumption. The controller may accordingly be configured to select Config.1 during time intervals where the load current t $I_{1v8}$ of the second converter section V1v8 is small.

The controller configures the first converter section V1v2 by selecting a first subset of individually controllable semiconductor switches of the switch matrix (not shown) and a first set of N flying capacitors to form a first converter topology configured to generate the first DC output voltage. The set of N flying capacitors may in one extreme comprise all the available flying capacitors and in another extreme none (0) of the available flying capacitors. The controller additionally configures the second converter section V1v8 by selecting a second subset of individually controllable semiconductor switches of the switch matrix (not shown) and a second set of (P–N) flying capacitors to form the second converter topology configured to generate the second DC output voltage. The second set of (P–N) flying capacitors accordingly comprises the residual flying capacitors after configuration of the first converter section V1v2. Hence, the second converter section may also in one extreme comprise all the available flying capacitors and in another extreme none (0) of the available flying capacitors depending on the configuration of the first converter section. The distribution of the flying capacitors Cf1, Cf2, Cf3 between the first and second converter sections, and the selection of respective topologies amongst those available for the selected number of flying capacitors, may be based on the appropriate topology selection rule—for example taking into consideration system variables like the current Vbat voltage, respective set-point voltages of Vo1 and Vo1 and current load currents of the converter sections.

According to some embodiments of the SC DC-DC converter 500, the controller is configured to distribute the flying capacitors between first and second converter sections and selecting the respective topologies thereof to maximize the total intrinsic energy efficiency of the first and second converter sections based on the determined system variables. This maximization of the total intrinsic conversion efficiency may lead to the above-discussed initial distribution of the flying capacitors under configuration 1 (Config.1) which makes the four different converter topologies listed in Table 1 above (under n=2) available to the first converter section and makes the two different converter topologies listed in Table 1 (under n=1) available to the second converter section. The controller thereafter selects a first converter topology for the first converter section V1v2 and a first converter topology for the second converter section V1v8—for example taking into consideration the current Vbat voltage and respective set-point voltages of Vo1 and Vo1. For example, if Vbat=4.2 V and set-point of Vo1=1.2 V, implying an VCR at about 0.285, as discussed above, the controller selects the 1/3 topology for the first converter section because the current operating point of the first converter section is relatively close to the iVCR for this 1/3 topology for the reasons discussed above in connection with FIG. 4. Following a similar reasoning, the controller may select the 1/2 topology for the second converter section V1v8, even though the VCR at the current operating point (Vbat=4.2 V and Vo1=1.8 V) of the second converter section is somewhat distant to the iVCR of this 1/2 topology. However, due to the small load power drawn by the second converter section V1v8, compared to the power drawn by the first converter section V1v2, the total energy loss of the SC DC-DC converter 500 as a whole imparted by the less-than-ideal converter topology of the second converter section remains small. It has a greater impact to make available a more ideal converter topology of the first converter section, i.e. with the best available energy efficiency, since the latter section consumes a majority of energy of the SC DC-DC converter 500 as a whole when operating under configuration 1.

In response to the change of loading of the second converter section from the previously discussed 1.0 mA in configuration 1 to 14 mA, the controller dynamically reconfigures the first and second converter sections by allocating a new subset of flying capacitors, e.g. Cf2, to the first converter section V1v2 and a new subset, e.g. Cf1, Cf3, to the second converter section V1v8. The new distribution of the flying capacitors Cf1, Cf2, Cf3 between first and second converter sections may once again be based on the appropriate topology selection rule—now taking into consideration the much larger load currents of the second converter section while the load current of the first converter section is largely unchanged. According to some embodiments of the SC DC-DC converter 500, the controller (not shown) is configured to redistribute the flying capacitors between first and second converter sections and selecting the respective topologies thereof to maximize the total intrinsic energy efficiency of the first and second converter sections taking into account the new, and higher, load of the second converter section. This maximization of the total intrinsic conversion efficiency may lead to the controller to make the illustrated assignment or allocation of flying capacitors under configuration 2 (Config.2). Configuration 2 makes merely two different converter topologies available to the first converter section but makes four different converter topologies available to the second converter section. The skilled person will understand that the larger number of topologies available to the second converter section under configuration 2 generally allows the controller to select a more ideal converter topology of the second converter section, i.e. with higher intrinsic energy efficiency. The intrinsic energy efficiency of the second converter section has now become important to maximize the total intrinsic energy efficiency of the SC DC-DC converter 500 due to the dominating portion of the load power drawn by the second converter section under configuration 2. Hence, the total energy loss of the SC DC-DC converter 500 as a whole imparted by a less-than-ideal converter topology selection for the first converter section remains small. The controller thereafter selects a second converter topology, e.g. 1/2, for the first converter section V1v2 and a second converter topology for the second converter section V1v8—for example still 1/2 if Vbat=4.2 V. However, in response to variations of Vbat the controller can switch to a more optimal topology of the second converter section in a flexible manner due to the larger selection of the topologies.

Configuration 3 and configuration 4 illustrate the operation of an alternative embodiment of the SC DC-DC converter 500, still using 3 flying capacitors, where the controller switches between these configurations under changing load conditions, but utilizes an alternative topology selection rule compared to the intrinsic energy efficiency maximization rule applied to the configurations 1 and 2. The present topology selection rule leads the controller to allocate all of the available flying capacitors Cf1, Cf2, Cf3 of the SC DC-DC converter 500 to the first converter section V1v2 and therefore allocate zero flying capacitors to the second converter section V1v8 under the load scenario of configuration 3. Hence, Vo1 may be regulated merely by a linear regulator leading to a significant energy loss in the second converter section. However, as noticed above, due to the small load power drawn by the second converter section compared to the load power drawn by the first converter section under configuration 3 the total energy loss of the SC DC-DC converter 500 caused by this less-than-idea topology of the second converter section remains small. In contrast, the availability of all flying capacitors to the first converter section makes a large number of different converter topologies as listed in Table 1 (under n=3) available to the first converter section. This large number of converter topologies enables the controller to maintain high intrinsic energy efficiency of the first converter section which is responsible for the majority of energy consumption of the SC DC-DC converter 500. This high intrinsic energy efficiency can be achieved despite a varying operating point of the first converter section by adaptively adjusting the converter topology for the reasons discussed above.

In response to the change of load current of second converter section from the previously discussed 0.1 mA in configuration 3 to a load current of 14 mA in configuration 4, the controller once again dynamically reconfigures the first and second converter sections by allocating a new subset of flying capacitors, e.g. Cf1, to the first converter section V1v2 and a new subset, e.g. Cf2, Cf3, to the second converter section V1v8. The new distribution of the flying capacitors Cf1, Cf2, Cf3 between first and second converter sections is based on the present topology selection rule—now taking into consideration the change of the load current of the second converter section while the load current of the first converter section is largely unchanged. The application of the present topology selection rule leads to the same flying capacitor allocation as the earlier topology rule. As discussed above, the larger number of topologies available to the second converter section under configuration 4 than under configuration 3 generally allows the controller to select a more ideal topology for the second converter section, i.e. with higher intrinsic energy efficiency, which is important to maximize the total intrinsic energy efficiency of the SC DC-DC converter 500 due to the dominating portion of the load power drawn by the second converter section.

The skilled person will understand that different topology selection rules of the SC DC-DC converter 500 can lead the controller to distribute the flying capacitors differently between first and second converter sections even for the same values of the system variables Vbat, respective setpoint voltages of Vo1 and Vo1 and load currents of the first and second converter sections.

Figure 6:
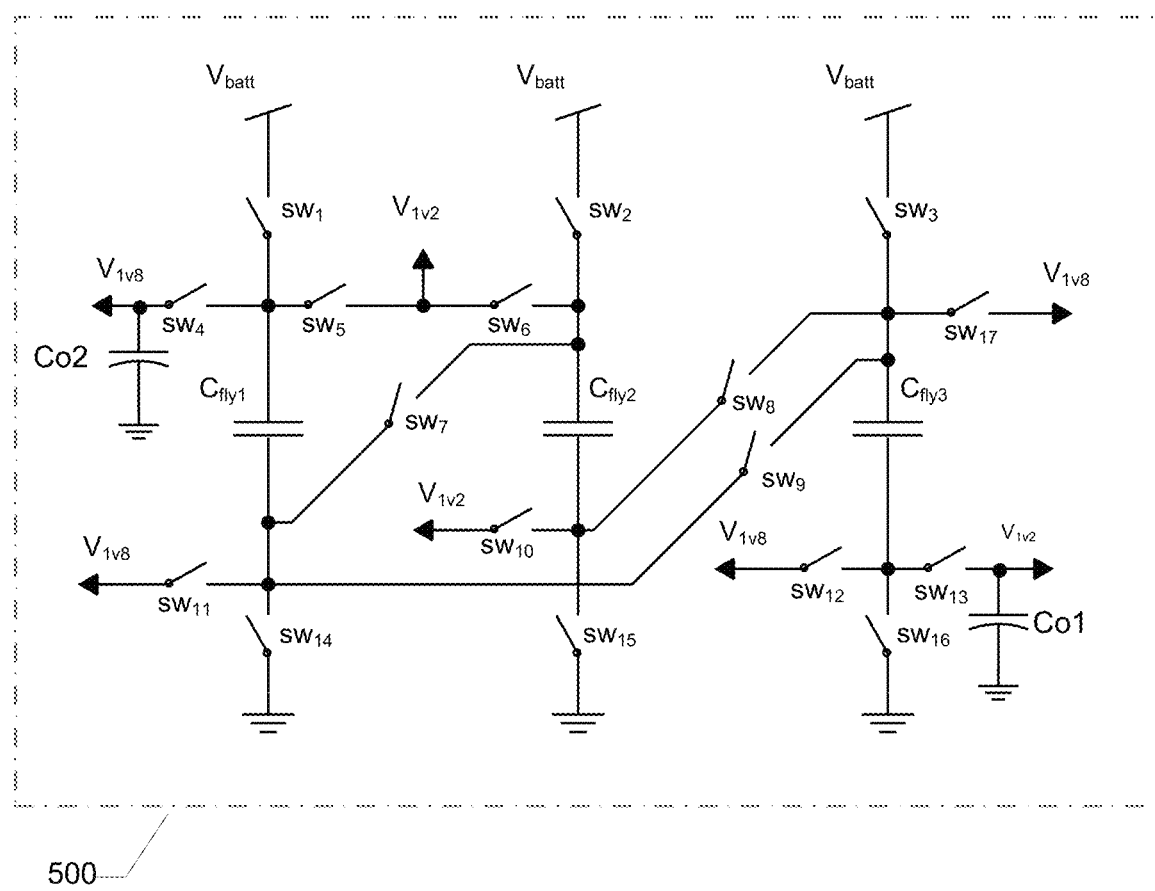
FIG. 6 shows a schematic circuit diagram of an exemplary embodiment of a switch matrix of the first embodiment of the step-down multiple output SC DC-DC converter.

FIG. 6 shows a schematic circuit diagram of an exemplary switch matrix of the SC DC-DC converter 500 and the connections between the internal node sets of the switch matrix and the flying capacitors Cf1, Cf2, Cf3. The switch matrix comprises seventeen individually controllable semiconductor switches SW1-SW17 which each may comprise a CMOS transistor of P-type or N-type or any other suitable switch type. The controller is connected to the gate terminal (now shown for simplicity) of each of the individually controllable semiconductor switches SW1-SW17 to selectively arrange each switch in an on-state and off-state. The first DC output voltage Vo1 of the SC DC-DC converter 500 is indicated as $V_{1v2}$ and the second DC output voltage Vo1 is indicated as $V_{1v8}$ and the first and second output capacitors Co1, Co2 are connected to the first the first and second DC output voltages, respectively. The topology of the switch matrix has been designed to allow independent and simultaneous operation of the first converter section and the second converter section to allow independent generation of the first DC output voltage and the second DC output voltage. Some embodiments of the switch matrix has a topology which allows all available topologies of the first and second converter sections to be selected and operate independently for any given configuration of the SC DC-DC converter 500. E.g. when the load current of the second converter section is high the second converter section should preferably be able to use the 2/3 topology at the same time as the first converter section is using the 1/2 topology, i.e. there is no overlap of the switch connections for these topologies. Alternative embodiments of the switch matrix may have a topology which imposes certain restrictions on the combinations of topologies of the first and second converter sections that can be selected and operate independently for any given configuration of the SC DC-DC converter 500 as discussed below.

In both instances, it is desirable to identify the specific switch matrix topology that requires the least amount of switches to implement all the desired topologies of the first and second converter sections in order to reduce the complexity of the interconnection and reduce parasitic switch capacitances associated with the individually controllable semiconductor switches. The latter factor deteriorates the extrinsic energy efficiency of the first and second converter sections.

The inventor's first approach to find an optimum or near-optimum solution to the switch matrix topology of the first embodiment of the SC Dc-DC converter was to manually add a topology to the capacitor interconnection one at a time. A solution with 18 switches was obtained in this way. As the task of designing the capacitor interconnection amounts to moving topologies around between the flying capacitors in the search for the minimal solution, a method to do this with an algorithm is introduced. To investigate whether it is possible to algorithmically evaluate all the possible designs of the capacitor interconnection, a concept designated the "interconnection matrix" is introduced. Consider the unconnected schematic 700A of FIG. 7 where each capacitor terminal or node of the three flying capacitors has been labeled with a number. Letting each number correspond to a row and a column in a matrix, a representation of the required interconnection for a given topology can be defined. Consider the example of the interconnection of a 1/2 topology for the first converter section 700B of FIG. 7. Each terminal of $C_{fly1}$ is connected to the various voltage rails to form the interconnection needed to implement 1/2 converter topology Notice that the concept of clock phases is not used here as it is sufficient to know whether a switch should be present between two nodes or not.

Figure 7:
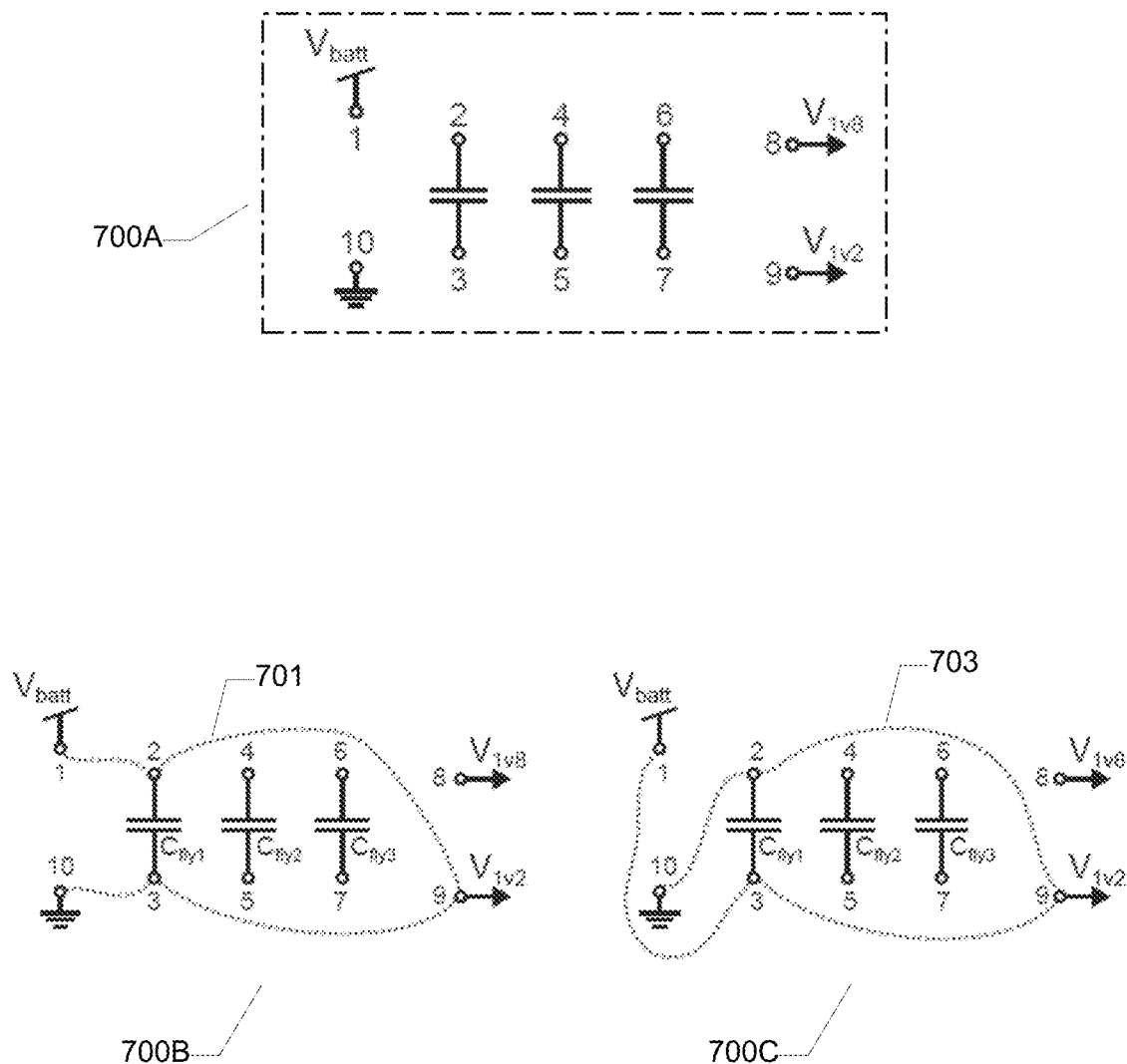
FIG. 7 shows circuit node diagrams illustrating computation of the topology of the exemplary switch matrix.

The interconnection matrix of the matrix topology 700B of FIG. 7 is named $T_{1/2,a}$ and is shown below in the left diagram 700B where a '1' indicates a connection and a '0' indicates no connection.

$$T_{1/2,a} = \begin{bmatrix} 1 & & & & & & & \\ 0 & 0 & & & & & & \\ 0 & 0 & 0 & & & & & \\ 0 & 0 & 0 & 0 & & & & \\ 0 & 0 & 0 & 0 & 0 & & & \\ 0 & 0 & 0 & 0 & 0 & 0 & & \\ 0 & 0 & 0 & 0 & 0 & 0 & 0 & \\ 0 & 1 & 1 & 0 & 0 & 0 & 0 & 0 \\ 0 & 0 & 1 & 0 & 0 & 0 & 0 & 0 \end{bmatrix}$$

$$T_{1/2,b} = \begin{bmatrix} 0 & & & & & & & \\ 1 & 0 & & & & & & \\ 0 & 0 & 0 & & & & & \\ 0 & 0 & 0 & 0 & & & & \\ 0 & 0 & 0 & 0 & 0 & & & \\ 0 & 0 & 0 & 0 & 0 & 0 & & \\ 0 & 0 & 0 & 0 & 0 & 0 & 0 & \\ 0 & 1 & 1 & 0 & 0 & 0 & 0 & 0 \\ 0 & 0 & 1 & 0 & 0 & 0 & 0 & 0 \end{bmatrix}$$

It is noticeable that only the lower half of the matrix is used to express the interconnection. The upper half would be a mirrored version of the lower part and all elements in the diagonal indicate the connection of a node to itself which is considered invalid. The matrix notation is used for easy manipulation of the interconnection by a computer, not for readability. The interconnection marked by dotted line 701 in matrix topology 700B of FIG. 7 is only one possible way of implementing the 1/2 topology of the first or second converter section with the three flying capacitors available. This first interconnection is coined "prototype". If only a single prototype was defined for each of the topologies to be implemented in the interconnection, an optimal solution would most likely not be reached (if any valid solution would be reached at all. In order to consider all possible implementations each converter prototype has to be permuted, i.e. moved around between the different flying capacitors, to define all the possible way that a particular topology can be implemented. An example of a permutation of the 1/2 converter prototype is given in diagram 700C of FIG. 7.

By comparing this interconnection with the diagram 700B of FIG. 7 the skilled person will appreciate that the connections to Cfly1 have been flipped between its terminals. Now two possible implementations of the 1/2 converter for the V1v2 converter has been defined. The topology can also be implemented with either Cfly2 or Cfly3 resulting in a total of 6 possible solutions. The number of possible interconnection matrices for each of the converters used in this design is listed in Table 2 below. The number of permutations can be found using the Binomial coefficient and simple combinatorics. Notice that the numbers for the 1/2 and 1/1 topologies have been listed twice, as there is one of these for both the V1v2 and V1v8 converter.

Multiplying the numbers of permutations in Table 2 gives the total number of switch interconnections:

$$TN,tot=(2\times 6)(2\times 6)\times 24\times 24\times 48=35,831,808.$$

Finally, an additional, and optional, constraint of having co-existence (i.e. simultaneous operation) between the 1/2 topology of the second converter section and the 1/3 topology of the first converter section is imposed on the solution. This optional constraint reduces the number of permutations to 13.271.040.

One practical way to evaluate all 35 million possible implementations, or alternatively in case of the optional constraint, all of the about 13.3 million possible implementations, is by a suitable computer program or script. A single prototype interconnection for each of the seven topologies needed is inputted to the script, and all the permutations are then computed. The constraints of not having any overlapping switch connections between converter topologies of the first and second converter sections that are operative at the same time are then imposed on each solution.

This procedure may conveniently be expressed in pseudo-code by steps of:
1. Define each converter topology by the prototype interconnection. A prototype interconnection comprises:
    a. A switch interconnect matrix, i.e. switch matrix, for each clock phase.
    b. A steady state voltage matrix for each clock phase.
    c. A coexistence group number;
2. For each converter topology, switch and voltage matrices (aka permutations) for all possible mappings to the three flying capacitors are computed:
    a. The flying capacitors needed by the converter topology are mapped to all combinations of the three available flying capacitors, e.g. for a 1/2 converter using a single flying capacitor, three switch matrices are generated, one for each of the three available flying capacitors.
    b. For each of the above mappings, additional mappings are generated where the terminals of each flying capacitor is either flipped or not;
3. All possible interconnect matrices of the first and second converter sections are generated by doing the following for all combinations of permutations of each topology:
    a. Choose a permutation of each of the converter topologies.
    b. Add switch matrices from each coexistence group.
    c. Check if any element in the resulting sum of switch matrices is above 1.
    If so, two topologies require the same switch, and thus cannot coexist.
    d. If no element is larger than 1 then for each matrix node find the maximum and minimum value of that particular matrix node in each of the topology voltage matrices and store the extremes in a maximum and minimum output stage voltage matrix.

e. The interconnect matrix of the first and second converter sections and combined voltage matrices thereof are stored if all coexistence constraints are fulfilled.
4. For each valid configuration of the first and second converter sections output stage determined in step 3, the following parameters are computed.
   a. The number of switches in the switch matrix.
   b. The maximum break down voltage required of each switch by comparing the switch matrix with the maximum and minimum combined output stage voltage matrices.
5. The solutions are filtered based on requirement of e.g. minimum number of switches or minimum break down voltage of each switch.

Along with the switch positions, the steady state unloaded node voltages are also given as input parameters for each prototype. These voltages are also permuted along with the switch interconnections to be able to evaluate the maximum breakdown voltage required for each switch (and optionally for picking the particular solution using the lowest number of high-voltage switches).

TABLE 2

| Topology | $2 \times \frac{1}{2}$ | $2 \times \frac{1}{1}$ | $\frac{1}{3}$ | $\frac{2}{3}$ | $\frac{2}{5}$ |
|---|---|---|---|---|---|
| Number of possible permutations | 2 × 6 | 2 × 6 | 24 | 24 | 48 |

The implemented search algorithm or script found 40 solutions each using 17 controllable switches. Out of these, the solution requiring the lowest number of high-voltage switches was chosen, but naturally alternative solutions, e.g. applying another optimization criterion, can readily be utilized in alternative embodiments of the SC DC-DC converter 500. The chosen solution for the switch matrix topology is presented on FIG.

The required switch breakdown voltages are for the present design with a maximum battery voltage of 4.2 V:
   5.0 V switches: sw3, sw7-sw9.
   3.3 V switches: sw1, sw2, sw4-sw6, sw11, sw12, sw14-sw16, sw17.
   1.8 V switches: sw10, sw13.

These voltages are for steady state operation and a careful assessment of the blocking voltage levels of the switches may be carried out for all load conditions as a safeguard when the transistor level implementation is made.

Figure 8:
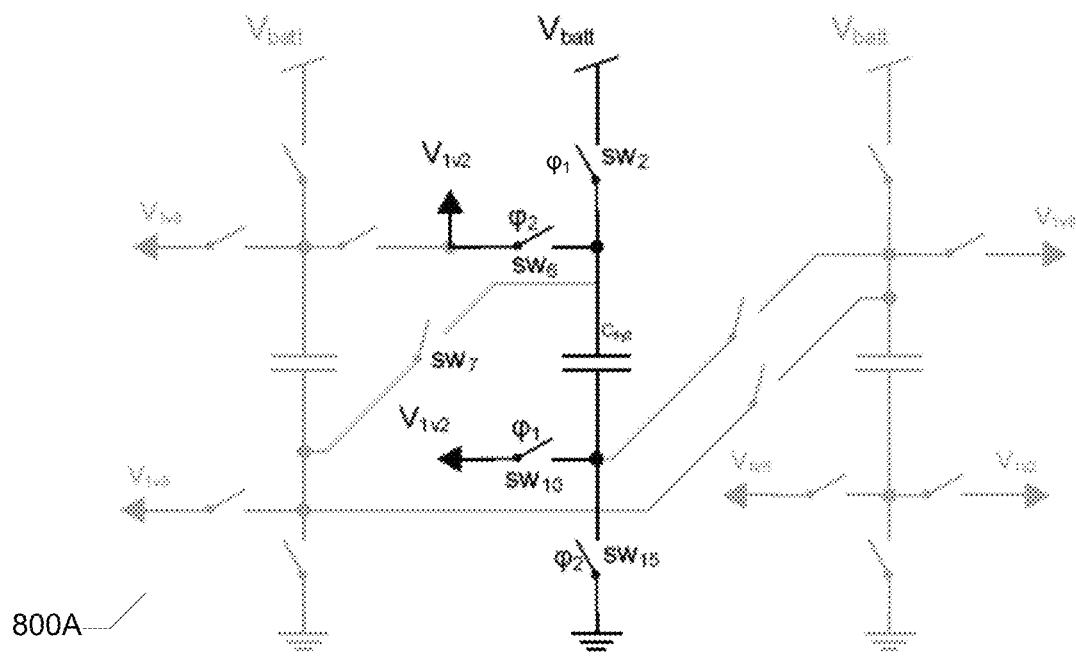
FIG. 8 shows schematic circuit diagrams of first and second converter sections of the first embodiment of the step-down multiple output SC DC-DC converter arranged in a first exemplary configuration.
Figure 8:
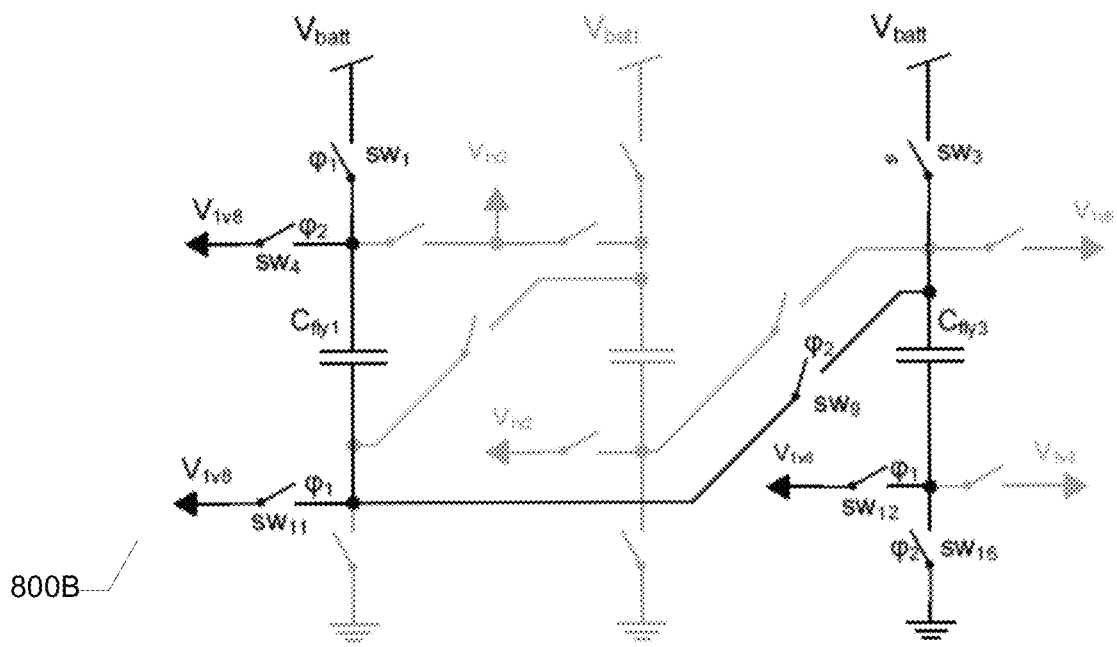

FIG. 8 shows schematic circuit diagrams of the first converter section 800A and the second converter section 800B of the SC DC-DC converter 500 arranged in a first exemplary configuration using the above-discussed topology of the switch matrix. The switch matrix comprises a total of seventeen individually controllable semiconductor switches SW1-SW17. The skilled person will understand that the illustrated first exemplary configuration of the SC DC-DC converter may correspond to configuration 2 of FIG. 5. The semiconductor switches and flying capacitors of the first converter section 800A have been drawn with full black line while the residual semiconductor switches and flying capacitors are marked by grey lines. The first converter section 800A comprises a first subset of active semiconductor switches, SW2, SW6, SW10 and SW15, which in conjunction with flying capacitor Cf2, i.e. $C_{fly2}$, form the first converter section 800A and its topology. The active semiconductor switches SW2 and SW10 are controlled by a first clock phase, $\varphi_1$, derived from a two-phase non-overlapping clock generator (not shown) of the SC DC-DC converter 500. The active semiconductor switches SW6 and SW15 are switched by a second clock phase, $\varphi_2$, of the two-phase non-overlapping clock generator in the illustrated 1/2 topology. The skilled person will appreciate that the controller by appropriate selection of the switches of the first subset of active semiconductor switches of the first converter section 800A can provide 1/1 topology or 1/2 topology—for example the 1/1 topology can be selected by switching SW15 permanently on and SW10 permanently off while SW6 and SW2 are still driven by the first and second clock phases, respectively.

The second converter section 800B comprises a second subset of active semiconductor switches and a second set of flying capacitors Cf1, Cf3 (=Cfly1, Cfly3) drawn with full black lines in the schematic circuit diagram while the residual semiconductor switches and flying capacitor(s) are marked by grey line to distinguish the components of the second converter section 800B from those of the first converter section 800A discussed above. The second set of active semiconductor switches comprises individual switches SW1, SW3, SW4, SW9, SW11, SW12 and SW16 which are switched either by the first clock phase, $\varphi_1$, or by the second clock phase, $\varphi_2$, as indicated on the diagram. The skilled person will appreciate that the second converter section 800B by appropriate selection of the second subset of active semiconductor switches can be adapted to form any of the previously discussed converter topologies as listed in TABLE 1 (under n=2). The skilled person will appreciate that the first and second subsets of active semiconductor switches of the first configuration of the SC DC-DC converter 500 do not overlap, i.e. there is not any common semiconductor switches in the first and second subsets. Likewise, separate flying capacitors are connected to the first and second converter sections 800A, 800B. This non-overlap property of the active and passive components between the first and second converter sections 800A, 800B enables the latter to operate entirely independently and generate the first and second DC output voltages Vo1, Vo1 in an independent or uncoupled manner—for example using merely two different clock phases. This independent operation is advantageous to avoid cross-coupling or interference between the first and second DC output voltages such that a large load change at one DC output voltage does not induce voltage changes on the other DC output voltage.

Figure 9:
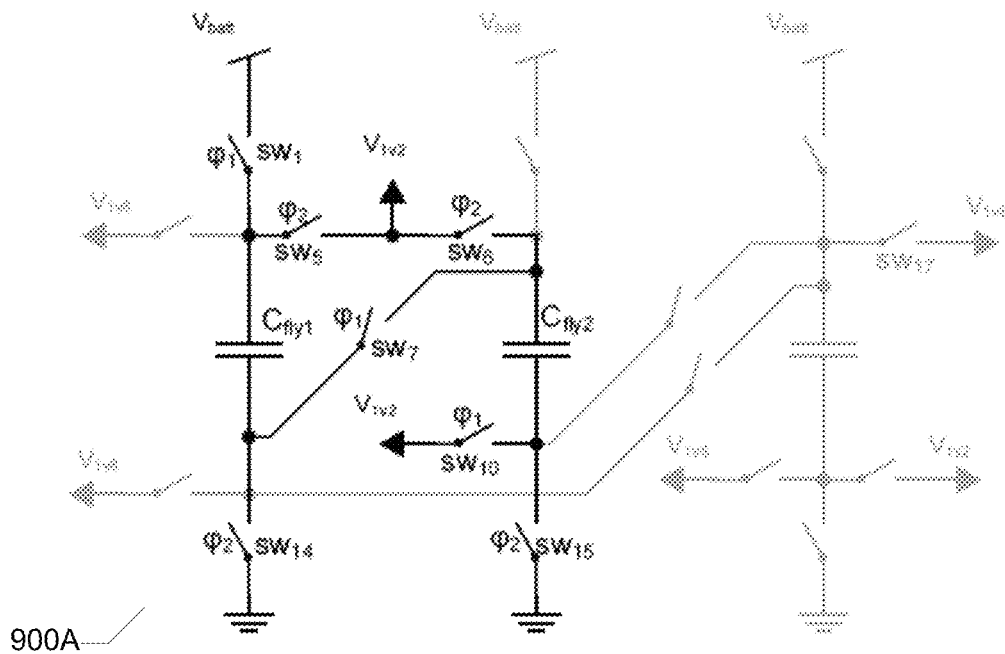
FIG. 9 shows schematic circuit diagrams of the first and second converter sections of the first embodiment of the step-down multiple output SC DC-DC converter arranged in a second exemplary configuration
Figure 9:
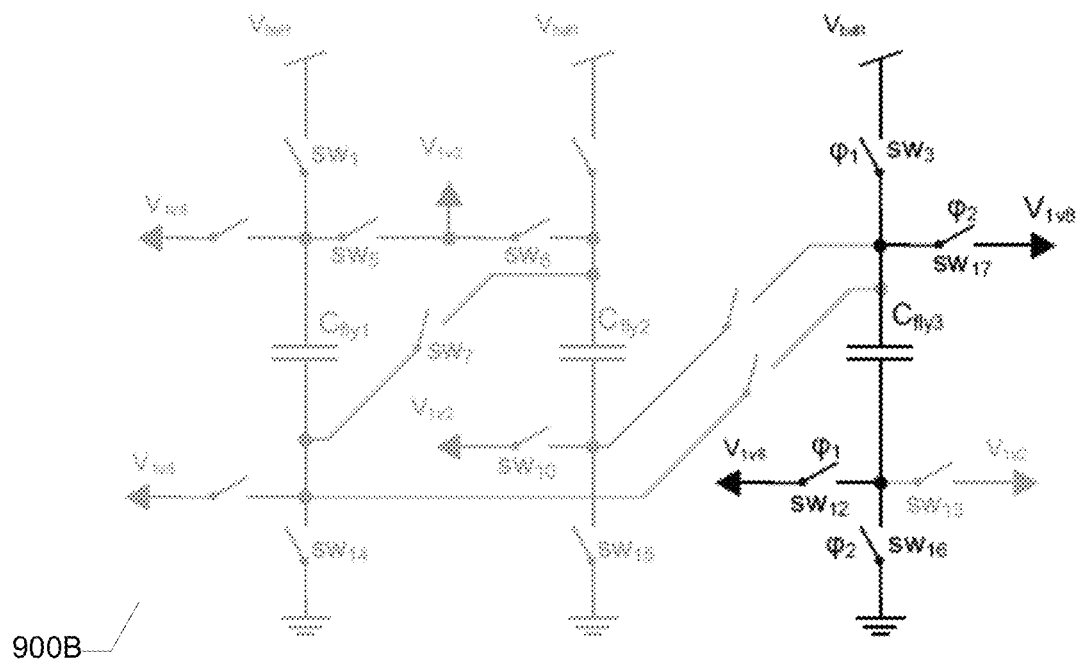

FIG. 9 shows schematic circuit diagrams of the first converter section 900A and the second converter section 900B of the SC DC-DC converter 500 arranged in a second exemplary configuration using the above-discussed preferred embodiment of the switch matrix. The skilled person will understand that the illustrated third exemplary configuration of the SC DC-DC converter may correspond to configuration 1 of FIG. 5. The subset of semiconductor switches and flying capacitors that form the first converter section 900A have been drawn with full black line. The residual semiconductor switches and the residual flying capacitor Cf3 are marked by grey lines in diagram 900A to indicate these components belong to the second converter section 900B. The subset of semiconductor switches of the first converter section 900A comprises individual switches SW1, SW5, SW6, SW7, SW10, SW14 and SW15 which in conjunction with flying capacitors Cf1, Cf2 form the topology of the first converter section 900A. The individual switches of the first subset of controllable semiconductor switches are either controlled by a first clock phase $\varphi_1$ or second clock phase $\varphi_2$ derived from the two-phase non-overlapping clock generator (not shown) of the SC DC-DC converter 500 as indicated on the circuit diagram. The skilled person will appreciate that the controller by appropriate selection of the first subset of semiconductor switches of the first converter section 900A can build the previously discussed converter topologies as listed in Table 1 (under n=2).

The schematic circuit diagram of the second converter section 900B shows the semiconductor switches and flying capacitor of the latter drawn with full black line while the residual semiconductor switches and flying capacitor(s) are marked by grey line to distinguish the components of the second converter section 900B from those of the first converter section 900A discussed above. The second subset of individually controllable, or active, semiconductor switches comprises SW3, SW12, SW16 and SW17 in combination with flying capacitor Cf3. The semiconductor switches of the second subset of individually controllable semiconductor switches are switched either by the first clock phase, $\varphi_1$, or by the second clock phase, $\varphi_2$, as indicated on the diagram. The skilled person will appreciate that the controller by appropriate selection of second subset of active semiconductor switches can provide a 1/1 topology or 1/2 topology of the second converter section 900B. The skilled person will appreciate that once again the first and second subsets of individually controllable semiconductor switches do not overlap, i.e. there is not any common semiconductor switches in the first and second subsets. Likewise, separate sets of the flying capacitors are allocated to the first and second converter sections 900A, 900B leading to the previously discussed advantages of the SC DC-DC converter 500.

Figure 10:
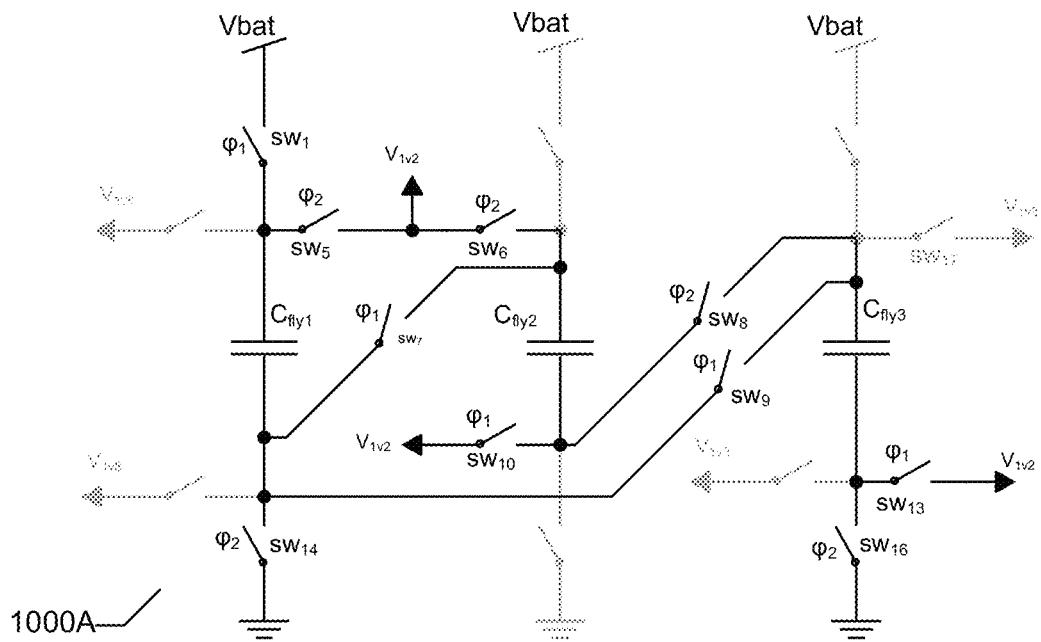
FIG. 10 shows schematic circuit diagrams of the first converter section of the exemplary step-down multiple output SC DC-DC converter arranged in a third exemplary configuration.

FIG. 10 shows a schematic circuit diagram of the first converter section 1000A of the SC DC-DC converter 500 arranged in a third exemplary configuration using the above-discussed embodiment of the switch matrix. The skilled person will understand that the illustrated third exemplary configuration of the SC DC-DC converter may correspond to configuration 3 of FIG. 5. A first subset of active semiconductor switches and all available flying capacitors Cf1, Cf2, Cf3 (=Cfly1-3) of the first converter section 1000A have been drawn with full black line while the residual semiconductor switches and flying capacitors (none) are marked by grey lines to indicate the active components of the first converter section 1000A. The first subset of controllable active semiconductor switches comprises individual switches SW1, SW5, SW6, SW7, SW8, SW9, SW10, SW13, SW14, SW16 which in conjunction with Cf1, Cf2 and Cf3 form the topology of the first converter section 1000A. The individual switches of the first subset of controllable semiconductor switches are either controlled by a first clock phase $\varphi_1$ or second clock phase $\varphi_2$ derived from a two-phase non-overlapping clock generator (not shown) of the SC DC-DC converter 500 as indicated on the figure. The skilled person will appreciate that the controller by appropriate selection of the switches of the first subset of active semiconductor switches of the first converter section 1000A can provide the previously discussed converter topologies as listed in Table 1 (under n=3).

The schematic circuit diagram of the second converter section is not shown because the second subset of individually controllable, or active, semiconductor switches is empty, i.e. without any semiconductor switches. The skilled person will appreciate that the SC DC-DC converter 500 may include a linear voltage regulator connected between the battery voltage Vbat and the output capacitor Co2 coupled to the second DC output voltage V1v8. The linear voltage regulator may, in the present configuration, be configured to adjust the second DC output voltage V1v8 to the desired target DC voltage and may comprise an NMOS common drain linear regulator in view of the relatively large voltage drop across the NMOS pass transistor. The skilled person will appreciate that once again the first and second subsets of individually controllable semiconductor switches do not overlap, i.e. there is not any common semiconductor switches in the first and second subsets.

Figure 11:
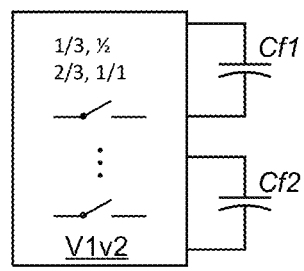
FIG. 11 shows simplified schematic block diagrams of three exemplary configurations of a reconfigurable step-down multiple output SC DC-DC converter in accordance with a second embodiment.
Figure 11:
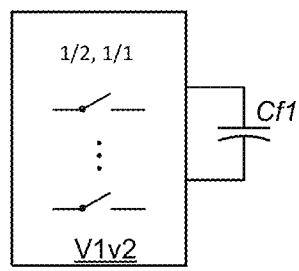
Figure 11:
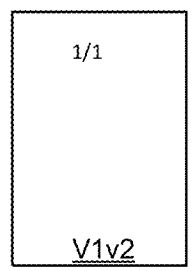
Figure 11:
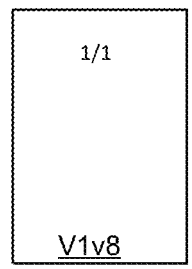
Figure 11:
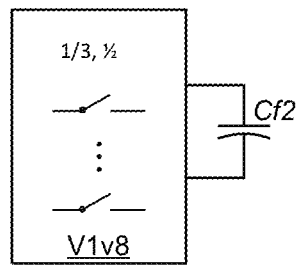
Figure 11:
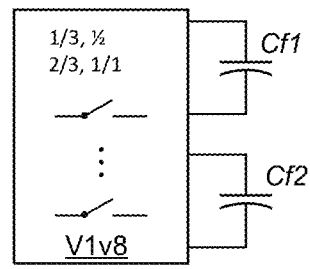

FIG. 11 shows simplified schematic block diagrams of three exemplary configurations—Config.1, Config.2 and Config 3 of a step-down multiple output switched capacitor (SC) DC-DC converter 1100 in accordance with a second embodiment thereof. The multiple output switched capacitor (SC) DC-DC converter 1100 may for example replace the previously discussed SC DC-DC converter of the hearing device 10 discussed in connection with FIG. 1 for supplying various circuit blocks with appropriate DC supply voltage. The multiple output switched capacitor (SC) DC-DC converter 1100 comprises two flying capacitors Cf1 and Cf2. The multiple output switched capacitor (SC) DC-DC converter 1100 comprises a first converter section V1v2 configured to generate a first DC output voltage (not shown) which may lie between nominally 0.6 V and 1.2 V depending on voltage supply requirements of the circuit blocks powered by the first DC output voltage Vo1. The SC DC-DC converter 1100 comprises a second converter section V1v8 configured to generate a second DC output voltage (not shown) which may lie between nominally 1.4 V and 2.2 V depending on voltage supply requirements of the circuit blocks powered by the second DC output voltage. The SC DC-DC converter 1100 is dynamically reconfigurable by enabling dynamic redistribution of the individual capacitors of the available set of flying capacitors Cf1 and Cf2 between the first and second converter sections V1v2, V1v8 similarly to the reconfigurable property of the previously discussed SC DC-DC converter 500 in accordance with the first embodiment. This feature enables dynamic topology changes of the first and second converter sections V1v2, V1v8—e.g. carried out in response to changing load conditions i.e. varying load current or load power at the first and second DC output voltages Vo1, Vo1. The redistribution of the available set of flying capacitors Cf1 and Cf2 may be carried out by a suitable controller of the SC converter 1100. The controller is connected to a common switch matrix (shown in FIG. 12) of the first and second converter sections V1v2, V1v8 and the controllable semiconductor switches of the switch matrix are interconnecting the flying capacitors Cf1 and Cf2 as discussed in additional detail below. The controller may comprise a digital state machine of the SC DC-DC converter 1100.

As discussed before, the controller may be configured to change the respective topologies of the first and second converter sections V1v2, V1v8 to define various configurations of the converter 1100 based on a suitable topology selection rule or selection criterion which for example aims at maximizing the intrinsic power conversion efficiency of the entire SC DC-DC converter 1100 taking into consideration the Vbat voltage and the current power delivered by each of the first and second DC output voltages.

The block diagrams of the three separate configurations—Config.1, Config.2 and Config.3—illustrate different load conditions at the first and second DC output voltages Vo1, Vo1 and a few possible ways of dynamically reconfiguring the SC DC-DC converter 1100 by the controller following the same mechanisms as those discussed above in connection with the SC DC-DC converter 500.

Figure 12:
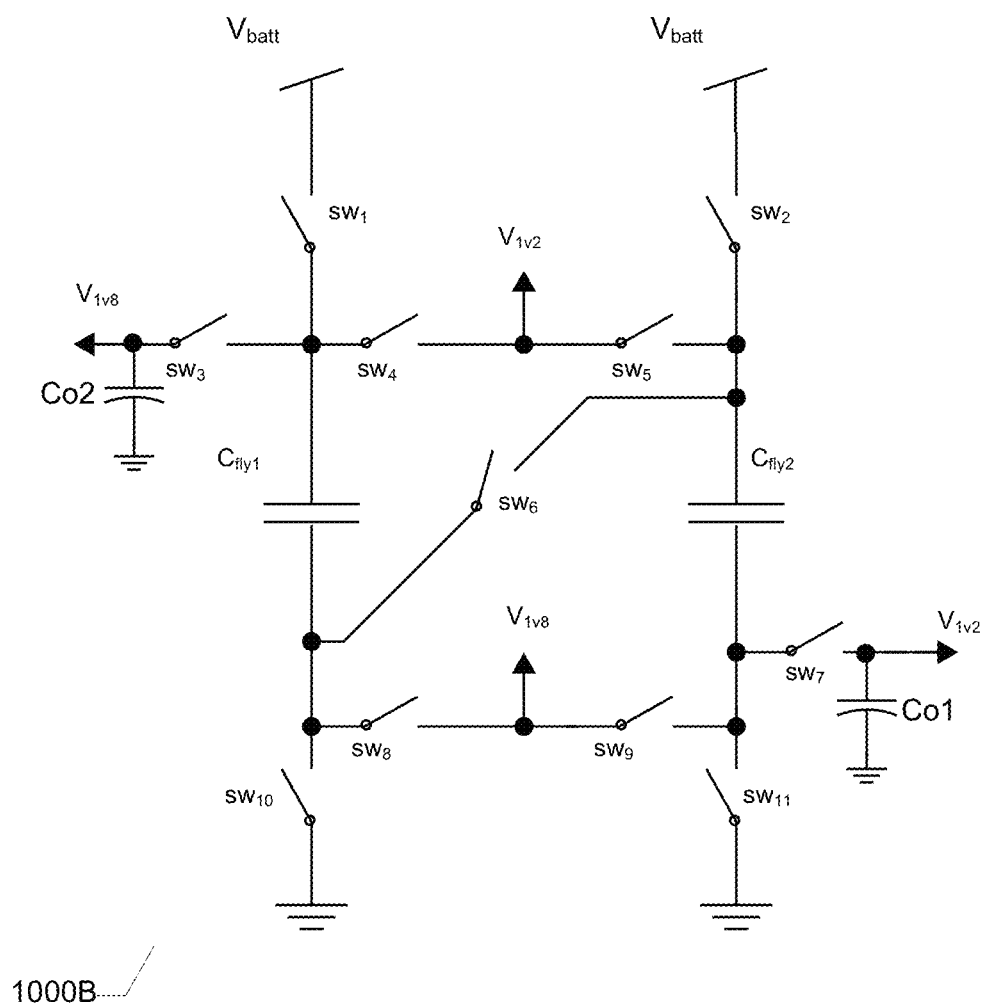
FIG. 12 shows a schematic circuit diagram of an exemplary embodiment of the switch matrix of the step-down multiple output SC DC-DC converter in accordance with the second embodiment.

FIG. 12 shows a schematic circuit diagram of an exemplary switch matrix of the second embodiment of the multiple output SC DC-DC converter 1100 and the connections between the internal node sets of the switch matrix and flying capacitors Cf1 and Cf2. The switch matrix comprises eleven individually controllable semiconductor switches SW1-SW11 which each may comprise a CMOS transistor of P-type or N-type or any other suitable switch type. The controller is connected to the gate terminal (now shown for simplicity) of each of the individually controllable semiconductor switches SW1-SW11 to selectively arrange each switch in an on-state and off-state. The first DC output voltage Vo1 of the SC DC-DC converter 1100 The first DC output voltage Vo1 of the SC DC-DC converter 1100 is indicated as V1v2 and the second DC output voltage Vo1 is indicated as V1v8 and the first and second output capacitors Co1, Co2 are connected to the first and second DC output voltages, respectively. The topology of the switch matrix has been designed to allow independent and simultaneous operation of the first converter section and the second converter section to allow independent generation of the first DC output voltage and the second DC output voltage. Some embodiments of the switch matrix has a topology which allows all available topologies of the first and second converter sections to be selected and operate independently for any given configuration of the SC DC-DC converter 1100. Alternative embodiments of the switch matrix may have a topology which puts certain restrictions on the combinations of topologies of the first and second converter sections that can be selected and operate independently for any given configuration of the SC DC-DC converter 1100.

In both instances, it is desirable to identify the specific switch matrix topology that requires the least amount of switches to implement all the desired topologies of the first and second converter sections in order to reduce the complexity of the interconnection and reduce parasitic switch capacitances associated with the individually controllable semiconductor switches. The latter parasitic switch capacitances increase the extrinsic energy loss of the first and second converter sections and thereby deteriorate the total intrinsic energy efficiency of the sections. The topology of the present switch matrix was determined using a similar approach to the one discussed above, i.e. algorithmically evaluating all the possible designs of the capacitor interconnections, appropriately modified with the constraint of merely having two flying capacitors available.

Figure 13:
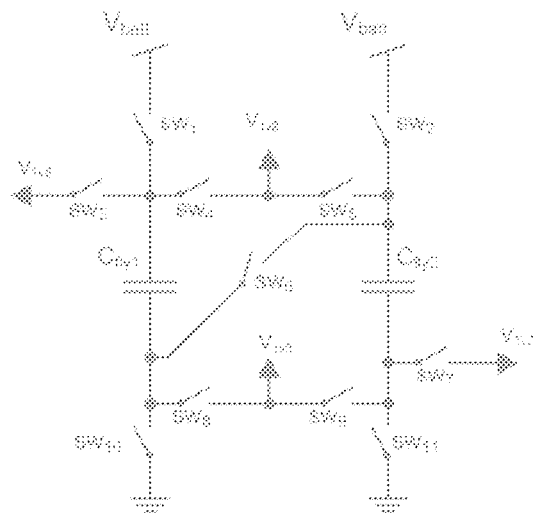
FIG. 13 shows schematic circuit diagrams of first and second converter sections of the second embodiment of the step-down multiple output SC DC-DC converter arranged in first and second exemplary configurations.
Figure 13:
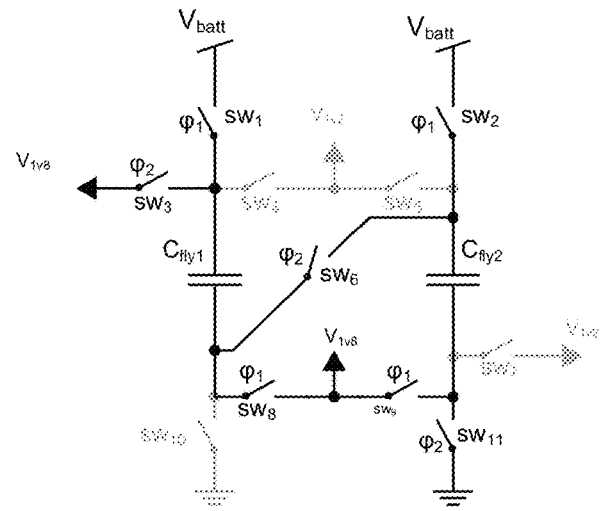
Figure 13:
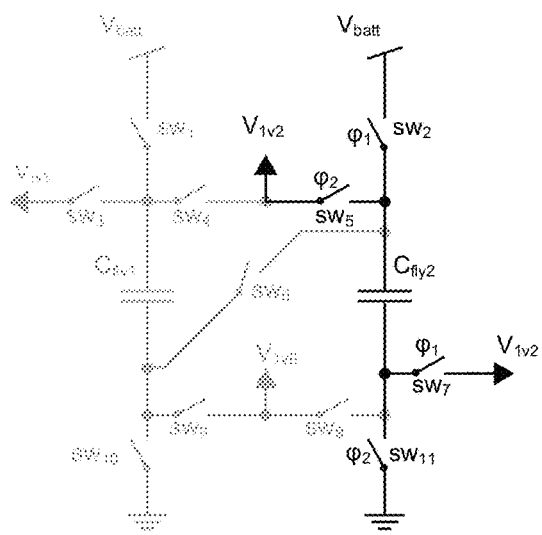
Figure 13:
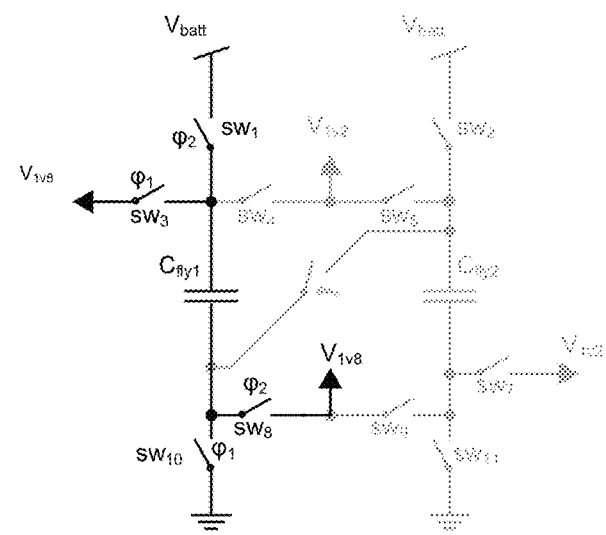

The topmost portion of FIG. 13 shows schematic circuit diagrams of the first converter section 1300A and the second converter section 1300B of the SC DC-DC converter 1100 arranged in a first exemplary configuration using the above-discussed topology of the switch matrix of the SC DC-DC converter 1100. The lower portion of FIG. 13 shows schematic circuit diagrams of the first converter section 1300A and the second converter section 1300B of the SC DC-DC converter 1100 arranged in a second exemplary configuration using the above-discussed topology of the switch matrix of the SC DC-DC converter 1100. The skilled person will understand that the illustrated first exemplary configuration of the SC DC-DC converter may correspond to configuration 3 of FIG. 11 where both the available set of flying capacitors Cf1 and Cf2 are coupled to the second converter section 1300B. The second exemplary configuration of the SC DC-DC converter may correspond to configuration 2 of FIG. 11 where both the one of the available flying capacitors is coupled to the first converter section and the other flying capacitor is coupled to the second converter section 1300B.

Figure 14:
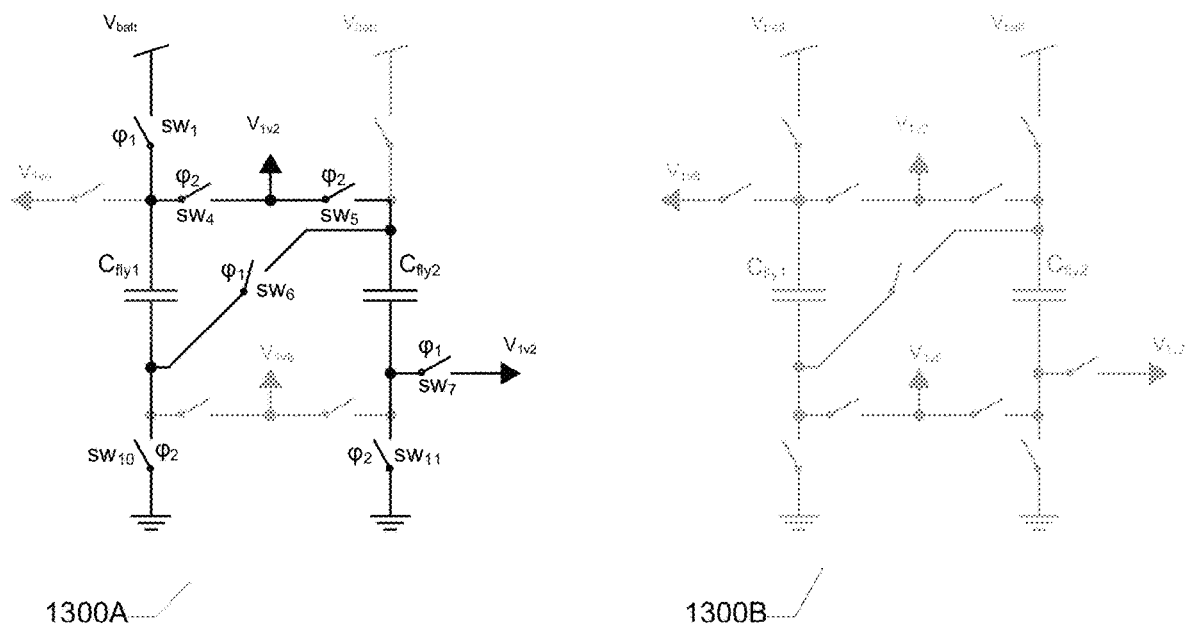
FIG. 14 shows schematic circuit diagrams of the first and second converter sections of the second embodiment of the step-down multiple output SC DC-DC converter arranged in a third exemplary configuration.

FIG. 14 shows a schematic circuit diagram of the first converter section 1300A and the second converter section 1300B of the SC DC-DC converter 1100 arranged in a third exemplary configuration using the above-discussed topology of the switch matrix of the SC DC-DC converter 1100. The first and second output capacitors Co1, Co2 are not shown for simplicity. The skilled person will understand that the illustrated third exemplary configuration of the SC DC-DC converter may correspond to configuration 1 of FIG. 11 where both the available set of flying capacitors Cf1 and Cf2 are coupled to the first converter section 1300A. The semiconductor switches and flying capacitors of the first converter section 1100A have been drawn with full black line while the residual semiconductor switches and flying capacitors are marked by grey lines as discussed above in connection with the first embodiment of the SC DC-DC converter 500.

Figure 15:
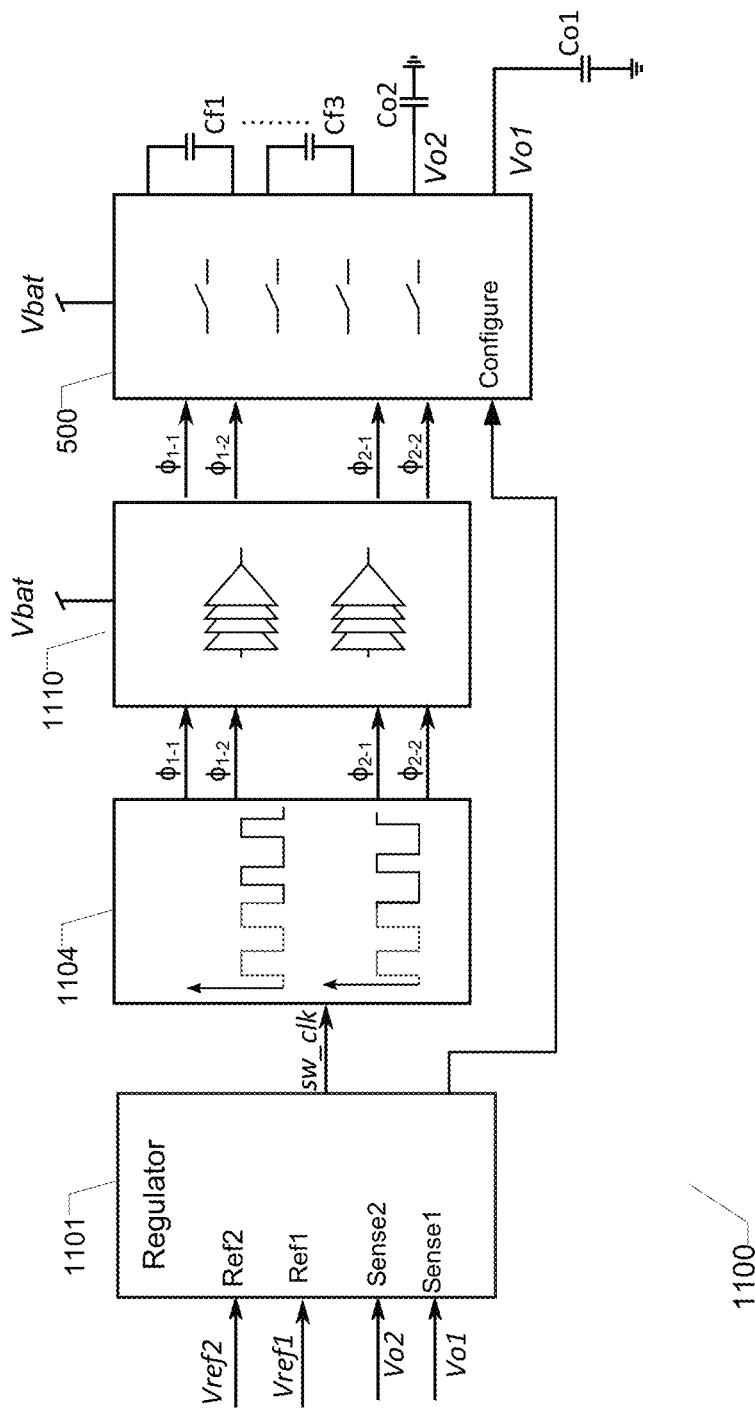
FIG. 15 shows a block diagram of an exemplary embodiment of the reconfigurable step-down multiple output SC DC-DC converter.

FIG. 15 shows one embodiment 1100 of the previously disclosed exemplary step-down multiple output SC DC-DC converters. The DC input voltage Vbat for the present SC DC-DC converter 1100 may be supplied by a rechargeable battery source delivering a nominal DC voltage significantly higher than desired or optimum supply voltages for the respective active circuit blocks of the hearing device. The rechargeable battery source may for example comprise one or more Li-Ion battery cells that each may exhibit a nominal output voltage of about 3.7 V. Where the SC DC-DC converter 1100 is integrated in the previously discussed head-wearable hearing device, it is often desirable to step-down this nominal Li-Ion battery voltage to a first DC output voltage Vo1 around 1.2 V which is the typical voltage level of conventional non-rechargeable Zinc-air batteries. In addition, the active circuitry of the hear-wearable hearing device may also require a second and different DC supply voltage around 1.8 V for example to supply the wireless transceiver or non-volatile memory discussed previously. Consequently, a first DC reference voltage Vref1 is applied at a Ref1 input of a controller 1101 of the SC DC-DC converter 1100. A second DC reference voltage Vref2 applied at a Ref2 input of the controller 1101. The controller 1101 may function as a combined configuration selector for the output stage 500 and output voltage regulator for the first and second DC output voltages Vo1, Vo1. The output voltage regulator function of the controller 1101 may include a clock generator (not shown) which sets the clock frequency of the output stage 500 or charge pump circuit. The clock generator generates a clock signal sw_clk which may have an adjustable or programmable frequency in the present embodiment while alternative embodiments may use a single fixed clock frequency of the clock signal. A clock phase circuit 1104 is configured to derive a first pair of non-overlapping clock phases $\varphi_{1-1}$, $\varphi_{1-2}$ from the clock signal and a second pair of non-overlapping clock phases $\varphi_{2-1}$, $\varphi_{2-2}$ from the clock signal. The first pair of non-overlapping clock phases $\varphi_{1-1}$, $\varphi_{1-2}$ are applied to the individually controllable semiconductor switches of the first converter section through a switch driver or voltage boost circuit 1110 and the second pair of non-overlapping clock phases $\varphi_{2-1}$, $\varphi_{2-2}$ are applied to the individually controllable semiconductor switches of the second converter section through the switch driver circuit 1110. The switch driver circuit 1110 is configured to raise the respective voltage levels of the first and second pair of non-overlapping clock phases as needed to appropriately drive the semiconductor switches of the output stage 500.

The use of a separate pair of non-overlapping clock phases for each of the first and second converter sections has the advantage that it largely eliminates cross-regulation problems between the first and second DC output voltages Vo1, Vo1 generated by the first and second converter sections. The skilled person will understand that the clock generator and clock phase circuit 1104 may be integrally formed. In the present embodiment, the frequency of the clock signal is utilized to provide regulation of the first and/or second DC output voltage Vo1, Vo1 via first and second voltage regulation loops extending from the first and second DC output voltages and back to first and second voltage sense inputs, Sense1 and sense 2 of the controller e.g. via respective feedback wires or conductors.

The output voltage regulator additionally comprises first and second DC reference voltage inputs, Ref1 and Ref2, for receipt of a first DC reference voltage Vref1 indicating the desired or target output voltage of Vo1 and receipt of a second DC reference voltage Vref2 indicating the desired or target output voltage of Vo1. The first and second voltage regulation loops are operable to minimize a voltage difference or deviation between the respective DC reference voltage at the Vref inputs and the actual the DC output voltages by adjusting the respective clock frequencies of the pairs of non-overlapping clock phases.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

The invention claimed is:

1. A head-wearable hearing device comprising a switched capacitor DC-DC converter, the switched capacitor DC-DC converter comprising:
 a plurality of individually controllable semiconductor switches,
 P flying capacitors, and
 a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P–N) flying capacitor(s) from the P flying capacitors;
 wherein P >1;
 wherein N is a positive integer, and $0<=N<=P$; and
 wherein the controller is configured to dynamically reconfigure the first and second converter sections in response to a system control signal of a signal processor of the head-wearable hearing device, the system control signal indicating an upcoming change of load.

2. The head-wearable hearing device according to a claim 1, wherein the controller is configured to dynamically reconfigure:
 the first converter section to form a third converter topology configured to generate a first DC output voltage based on a third subset of the individually controllable semiconductor switches and a third set of M flying capacitor(s) from the P flying capacitors, and the second converter section to form a fourth converter topology configured to generate a second DC output voltage based on a fourth subset of the individually controllable semiconductor switches and a fourth set of (P–M) flying capacitor(s) from the P flying capacitors;
 wherein M is a positive integer; $0<=M<=P$; and $N \neq M$.

3. The head-wearable hearing device according to a claim 1, wherein the switched capacitor DC-DC converter further comprises a clock generator configured to generate first and second pairs of non-overlapping clock phases based on a clock signal, and wherein the controller is configured to:
 charge the first set of N flying capacitor(s) of the first converter section during a first clock phase of the first pair of non-overlapping clock phases, and charge the second set of (P–N) flying capacitor(s) of the second converter section during a first clock phase of the second pair of non-overlapping clock phases; and
 discharge the first set of N flying capacitor(s) during a second clock phase of the first pair of non-overlapping clock phases, and discharge the second set of (P–N) flying capacitor(s) of the second converter section during a second phase of the second pair of non-overlapping clock phases.

4. The head-wearable hearing device according to a claim 1, wherein the controller is configured to:
 during a first clock phase of a first pair of non-overlapping clock phases, series connect the first set of N flying capacitor(s) via the first subset of individually controllable semiconductor switches to charge the N flying capacitor(s), and
 during a first clock phase of a second pair of non-overlapping clock phases, series connect the second set of (P–N) flying capacitor(s) via the second subset of individually controllable semiconductor switches to charge the (P–N) flying capacitor(s).

5. The head-wearable hearing device according to claim 4, wherein the controller is configured to:
 during a second clock phase of the first pair of non-overlapping clock phases, parallel connect the N flying capacitor(s) via the first subset of individually controllable semiconductor switches to discharge the N flying capacitor(s) into a first output capacitor, and
 during a second clock phase of the second pair of non-overlapping clock phases, parallel connect the second set of (P–N) flying capacitor(s) via the second subset of individually controllable semiconductor switches to discharge the (P–N) flying capacitors into a second output capacitor.

6. The head-wearable hearing device according to claim 1, wherein the controller is configured to operate in a way that maximizes a total intrinsic energy efficiency $n_{tot}$ of the first and second converter sections, wherein:

$$\eta_{tot} = \frac{P_1 + P_2}{\frac{P_1}{\eta_1} + \frac{P_2}{\eta_2}}$$

and wherein:
$P_1$=Load power delivered by the first converter section;
$P_2$=Load power delivered by the second converter section;
$\eta_1$=Intrinsic energy efficiency of the first converter at a target or a set-point voltage of a first DC output voltage; and
$\eta_2$=Intrinsic energy efficiency of the second converter section at a target or a set-point voltage of a second DC output voltage.

7. The head-wearable hearing device according to claim 1, wherein P=2, 3 or 4.

8. A head-wearable hearing device comprising a switched capacitor DC-DC converter, the switched capacitor DC-DC converter comprising:
- a plurality of individually controllable semiconductor switches,
- P flying capacitors, and
- a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;

wherein P >1;
wherein N is a positive integer, and 0<=N<=P; and
wherein the controller is configured to operate based on:
- a load current or a load power supplied by the first converter section,
- a load current or a load power supplied by the second converter section,
- a target or a set-point voltage, Vo1, of a first DC output voltage,
- a target or a set-point voltage, Vo2, of a second DC output voltage, or
- any combination of the foregoing.

9. The head-wearable hearing device according to claim 8, wherein the controller is configured to:
- during a first clock phase of a first pair of non-overlapping clock phases, series connect the first set of N flying capacitor(s) via the first subset of individually controllable semiconductor switches to charge the N flying capacitor(s), and
- during a first clock phase of a second pair of non-overlapping clock phases, series connect the second set of (P−N) flying capacitor(s) via the second subset of individually controllable semiconductor switches to charge the (P−N) flying capacitor(s).

10. The head-wearable hearing device according to claim 8, wherein the controller is configured to repeatedly determine:
- a value of load current or load power of the first converter section, and
- a value of load current or load power of the second converter section.

11. The head-wearable hearing device according to claim 8, wherein the controller is configured to dynamically reconfigure the first and second converter sections in response to a system control signal of a signal processor of the head-wearable hearing device.

12. The head-wearable hearing device according to claim 8, wherein the controller is configured to select P flying capacitors for the first topology of the first converter section, and to select zero (0) flying capacitors for the second topology of the second converter section.

13. The head-wearable hearing device according to a claim 8, wherein the controller is configured to select zero (0) flying capacitor for the first topology of the first converter section, and to select P flying capacitors for the second topology of the second converter section.

14. The head-wearable hearing device according to claim 8, wherein P=2, 3 or 4.

15. A head-wearable hearing device comprising a switched capacitor DC-DC converter, the switched capacitor DC-DC converter comprising:
- a plurality of individually controllable semiconductor switches,
- P flying capacitors, and
- a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;

wherein P >1;
wherein N is a positive integer, and 0<=N<=P; and
wherein the controller is configured to repeatedly determine:
- a value of load current or load power of the first converter section, and
- a value of load current or load power of the second converter section.

16. A head-wearable hearing device comprising a switched capacitor DC-DC converter, the switched capacitor DC-DC converter comprising:
- a plurality of individually controllable semiconductor switches,
- P flying capacitors, and
- a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;

wherein P >1;
wherein N is a positive integer, and 0<=N<=P; and
wherein the controller is configured to switch a first configuration of the first and second converter sections to a second configuration of the first and second converter sections if an energy efficiency of the second configuration exceeds an energy efficiency of the first configuration.

17. A head-wearable hearing device comprising a switched capacitor DC-DC converter, the switched capacitor DC-DC converter comprising:
- a plurality of individually controllable semiconductor switches,
- P flying capacitors, and
- a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;

wherein P >1;

wherein N is a positive integer, and 0<=N<=P; and wherein the controller is configured to select P flying capacitors for the first topology of the first converter section, and to select zero (0) flying capacitors for the second topology of the second converter section.

18. The head-wearable hearing device according to claim 17, wherein the controller is configured to select P flying capacitors for the first topology of the first converter section, and to select zero (0) flying capacitors for the second topology of the second converter section, in response to a load current or a load power supplied by the first converter section being at least 5 times larger than a load current or a load power supplied by the second converter section.

19. A head-wearable hearing device comprising a switched capacitor DC-DC converter, the switched capacitor DC-DC converter comprising:
 a plurality of individually controllable semiconductor switches,
 P flying capacitors, and
 a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;
 wherein P >1;
 wherein N is a positive integer, and 0<=N<=P; and
 wherein the controller is configured to select zero (0) flying capacitor for the first topology of the first converter section, and to select P flying capacitors for the second topology of the second converter section.

20. The heard-wearable hearing device according to claim 19, wherein the controller is configured to select zero (0) flying capacitor for the first topology of the first converter section, and to select P flying capacitors for the second topology of the second converter section, in response to a load current or a load power supplied by the second converter section being at least 5 times larger than a load current or a load power supplied by the first converter section.

21. A head-wearable hearing device comprising a switched capacitor DC-DC converter, the switched capacitor DC-DC converter comprising:
 a plurality of individually controllable semiconductor switches,
 P flying capacitors, and
 a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;
 wherein P >1;
 wherein N is a positive integer, and 0<=N<=P;
 wherein the switched capacitor DC-DC converter comprises an output voltage regulator; and
 wherein the output voltage regulator comprises:
  a reference voltage input for receipt of a first DC reference voltage,
  a feedback voltage input for receipt of a feedback voltage representative of a first DC output voltage or a second DC output voltage, and
  an error signal generator configured to combine the first DC reference voltage and the feedback voltage to determine a first control signal.

22. The head-wearable hearing device according to claim 21, wherein the controller is configured to generate:
 a first pair of non-overlapping clock phases for the first subset of the individually controllable semiconductor switches of the first converter section based on the first control signal; and/or
 a second pair of non-overlapping clock phases for the second subset of the individually controllable semiconductor switches of the second converter section based on the first control signal.

23. A head-wearable hearing device comprising a switched capacitor DC-DC converter, the switched capacitor DC-DC converter comprising:
 a plurality of individually controllable semiconductor switches,
 P flying capacitors, and
 a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;
 wherein P >1;
 wherein N is a positive integer, and 0<=N<=P; and
 wherein the head-wearable hearing device further comprises at least one rechargeable battery cell for supplying a battery supply voltage.

24. The head-wearable hearing device according to claim 23, wherein the controller is configured to:
 during a first clock phase of a first pair of non-overlapping clock phases, series connect the first set of N flying capacitor(s) via the first subset of individually controllable semiconductor switches to charge the N flying capacitor(s), and
 during a first clock phase of a second pair of non-overlapping clock phases, series connect the second set of (P−N) flying capacitor(s) via the second subset of individually controllable semiconductor switches to charge the (P−N) flying capacitor(s).

25. The head-wearable hearing device according to claim 23, wherein the controller is configured to repeatedly determine:
 a value of load current or load power of the first converter section, and a value of load current or load power of the second converter section.

26. The head-wearable hearing device according to claim 23, wherein the controller is configured to dynamically reconfigure the first and second converter sections in response to a system control signal of a signal processor of the head-wearable hearing device.

27. The head-wearable hearing device according to claim 23, wherein the controller is configured to select P flying capacitors for the first topology of the first converter section, and to select zero (0) flying capacitors for the second topology of the second converter section.

28. The head-wearable hearing device according to claim 23, wherein the controller is configured to select zero (0) flying capacitor for the first topology of the first converter section, and to select P flying capacitors for the second topology of the second converter section.

29. The head-wearable hearing device according to claim 23, wherein P=2, 3 or 4.

30. The head-wearable hearing device according to claim 23, wherein the controller is configured to operate based on:
a load current or a load power supplied by the first converter section,
a load current or a load power supplied by the second converter section,
a target or a set-point voltage, Vo1, of a first DC output voltage,
a target or a set-point voltage, Vo2, of a second DC output voltage, or
any combination of the foregoing.

31. A head-wearable hearing device comprising a switched capacitor DC-DC converter, the switched capacitor DC-DC converter comprising:
a plurality of individually controllable semiconductor switches,
P flying capacitors, and
a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;
wherein P >1;
wherein N is a positive integer, and 0<=N<=P; and
wherein the first and second subsets of individually controllable semiconductor switches are non-overlapping.

32. A head-wearable hearing device comprising a switched capacitor DC-DC converter, the switched capacitor DC-DC converter comprising:
a plurality of individually controllable semiconductor switches,
P flying capacitors, and
a controller connected to respective control terminals of the plurality of individually controllable semiconductor switches, to configure (1) a first converter section to form a first converter topology based on a first subset of the individually controllable semiconductor switches, and based on a first set of N flying capacitor(s) from the P flying capacitors, and (2) a second converter section to form a second converter topology based on a second subset of the individually controllable semiconductor switches, and based on a second set of (P−N) flying capacitor(s) from the P flying capacitors;
wherein P >1;
wherein N is a positive integer, and 0<=N<=P; and
wherein the P flying capacitors are connected to circuit nodes associated with the controllable semiconductor switches.

33. The head-wearable hearing device according to claim 32, wherein the controller is configured to:
during a first clock phase of a first pair of non-overlapping clock phases, series connect the first set of N flying capacitor(s) via the first subset of individually controllable semiconductor switches to charge the N flying capacitor(s), and
during a first clock phase of a second pair of non-overlapping clock phases, series connect the second set of (P−N) flying capacitor(s) via the second subset of individually controllable semiconductor switches to charge the (P−N) flying capacitor(s).

34. The head-wearable hearing device according to claim 32, wherein the controller is configured to repeatedly determine:
a value of load current or load power of the first converter section, and
a value of load current or load power of the second converter section.

35. The head-wearable hearing device according to claim 32, wherein the controller is configured to dynamically reconfigure the first and second converter sections in response to a system control signal of a signal processor of the head-wearable hearing device.

36. The head-wearable hearing device according to claim 32, wherein the controller is configured to select P flying capacitors for the first topology of the first converter section, and to select zero (0) flying capacitors for the second topology of the second converter section.

37. The head-wearable hearing device according to claim 32, wherein the controller is configured to select zero (0) flying capacitor for the first topology of the first converter section, and to select P flying capacitors for the second topology of the second converter section.

38. The head-wearable hearing device according to claim 32, wherein P=2, 3 or 4.

39. The head-wearable hearing device according to claim 32, wherein the controller is configured to operate based on:
a load current or a load power supplied by the first converter section,
a load current or a load power supplied by the second converter section,
a target or a set-point voltage, Vo1, of a first DC output voltage,
a target or a set-point voltage, Vo2, of a second DC output voltage, or
any combination of the foregoing.

* * * * *